United States Patent
Sakaguchi et al.

(10) Patent No.: US 7,242,549 B2
(45) Date of Patent: Jul. 10, 2007

(54) MEDIA CARTRIDGE AUTOLOADER

(75) Inventors: Tomoaki Sakaguchi, Tama (JP); Peter A. Johnson, Colorado Springs, CO (US)

(73) Assignees: Mitsumi Electric Co., Ltd., Tokyo (JP); Quantum Corporation, San Jose, CA (US)

( * ) Notice: Subject to any disclaimer, the term of this patent is extended or adjusted under 35 U.S.C. 154(b) by 0 days.

(21) Appl. No.: 11/280,870

(22) Filed: Nov. 16, 2005

(65) Prior Publication Data

US 2007/0064339 A1 Mar. 22, 2007

(30) Foreign Application Priority Data

Sep. 16, 2005 (JP) ............................. 2005-269593

(51) Int. Cl.
*G11B 15/18* (2006.01)
(52) U.S. Cl. ..................................................... 360/69
(58) Field of Classification Search ................. 360/69, 360/55, 92; 720/627
See application file for complete search history.

(56) References Cited

U.S. PATENT DOCUMENTS

| | | | | |
|---|---|---|---|---|
| 3,500,551 A | * | 3/1970 | Polewski | .................... 369/216 |
| 6,388,974 B1 | * | 5/2002 | Kato | .......................... 720/627 |
| 2006/0291091 A1 | * | 12/2006 | Kawano et al. | ............... 360/92 |
| 2007/0030589 A1 | * | 2/2007 | Hori et al. | .................... 360/92 |
| 2007/0035871 A1 | * | 2/2007 | Hori | ............................. 360/92 |
| 2007/0047135 A1 | * | 3/2007 | Hori et al. | .................... 360/92 |

FOREIGN PATENT DOCUMENTS

JP  2003 045102  2/2003

* cited by examiner

*Primary Examiner*—Fred F. Tzeng
(74) *Attorney, Agent, or Firm*—Ladas & Parry LLP

(57) ABSTRACT

A media cartridge autoloader is disclosed which includes a media cartridge picker having a turntable capable of supporting a media cartridge and rotating to change the orientation of the media cartridge. A turntable rotating mechanism configured to rotate the turntable and a media cartridge transport mechanism configured to transport the media cartridge onto and off of the turntable are provided on the turntable. A mail slot through which the media cartridge is inserted or ejected, a media drive into which the media cartridge is loaded, and a media cartridge storage section configured to store the media cartridge are provided. The mail slot, the media drive, and the media cartridge storage section are arranged around the media cartridge picker. The media cartridge picker includes a turntable lifting mechanism that raises and lowers the turntable.

16 Claims, 22 Drawing Sheets

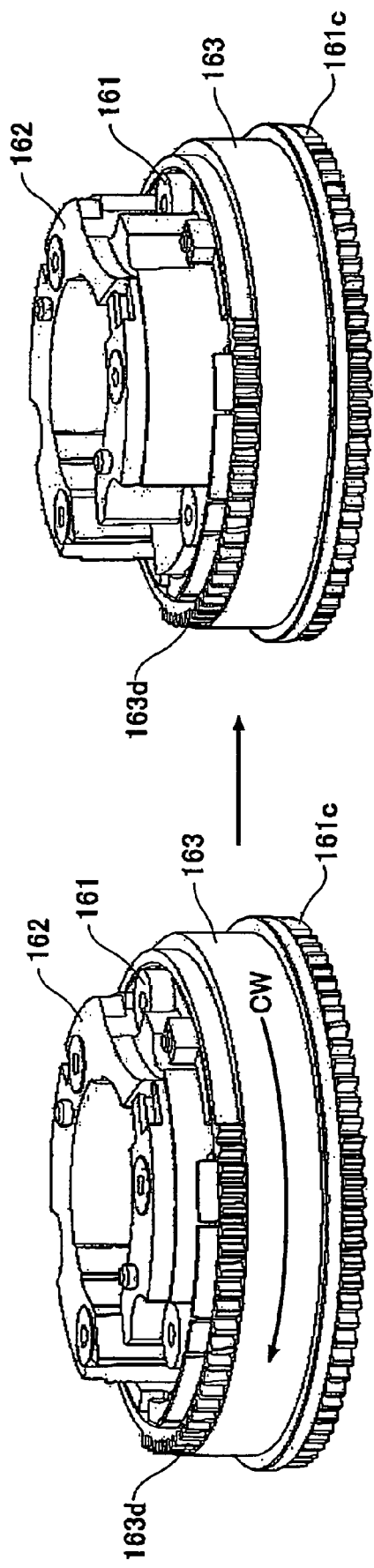

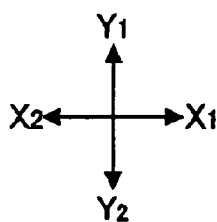
FIG.15A
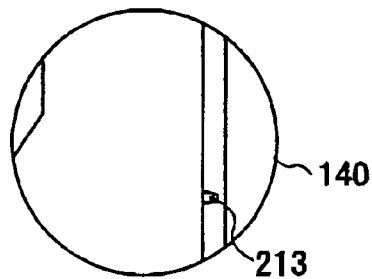
FIG.15D
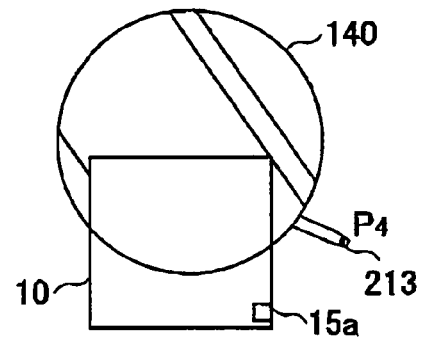
FIG.15B
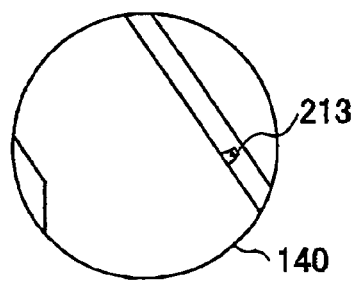
FIG.15E
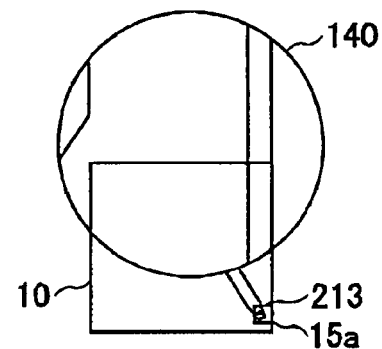
FIG.15C
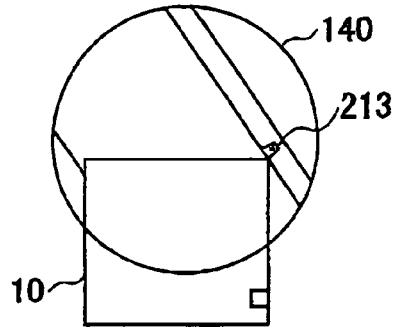
FIG.15F
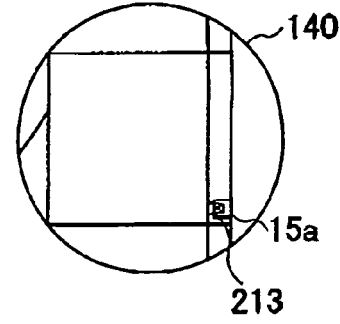

MEDIA CARTRIDGE AUTOLOADER

BACKGROUND OF THE INVENTION

1. Field of the Invention

The present invention relates to a media cartridge autoloader, and particularly relates to a media cartridge picker that moves a media cartridge in a media cartridge autoloader serving as a data storage unit.

2. Description of the Related Art

A typical media cartridge autoloader includes a media cartridge picker in the center, a mail slot at the front side, at least one media drive at the rear side, and media cartridge transport magazines at the lateral sides.

The media cartridge picker is configured to retrieve a media cartridge and transport it between the mail slot, the media drive, and the media cartridge transport magazines. The media cartridge autoloader may be mounted on a rack. For space considerations, a specified height for the media cartridge autoloader may be required. For example, the media cartridge autoloader may have a height requirement of "2U" as illustrated in FIG. 1, to allow the media cartridge autoloader to be fitted into a zack system that supports the media cartridge autoloader.

The media cartridge picker includes a base, a turntable configured to rotate on the base so as to change the orientation of the media cartridge, and a media cartridge transport mechanism provided on the turntable and configured to retrieve and transport the media cartridge.

As for the media drive, plural types are available commercially. The height of a media cartridge inserting slot varies according to the type of media drive used.

In the conventional technology, the height of the media drive is adjusted so as to match the media cartridge inserting slot with the height of the turntable of the media cartridge picker.

In a case of a media drive where the media cartridge inserting slot thereof is disposed at a low position, it is necessary to raise the media drive at a higher position by putting a plate under the media drive. In some cases, the height of the media cartridge autoloader becomes greater than the height 2U of the media cartridge autoloader. Thus, the media cartridge autoloader does not meet the customers' needs.

SUMMARY OF THE INVENTION

The present invention provides a media cartridge autoloader to solve one or more of the problems described above.

In a preferred embodiment, the present invention provides a media cartridge autoloader that comprises a media cartridge picker including a turntable capable of supporting a media cartridge and rotating to change the orientation of the media cartridge supported there; a turntable rotating mechanism configured to rotate the turntable; a media cartridge transport mechanism provided on the turntable and configured to transport the media cartridge onto and off of the turntable; a mail slot through which the media cartridge is inserted or ejected; a media drive into which the media cartridge is loaded; and a media cartridge storage section configured to store the media cartridge therein. The mail slot, the media drive, and the media cartridge storage section are arranged around the media cartridge picker, and the media cartridge picker includes a turntable lifting mechanism for raising and lowering the turntable.

According to the present invention, the turntable is raised and lowered so as to adjust the height of the turntable to the height of a media drive of any maker. With this configuration, whatever media drive is attached, the height of the media cartridge autoloader can be maintained at approximately 2U.

BRIEF DESCRIPTION OF THE DRAWINGS

FIGS. 14A and 14B are views illustrating a cylindrical section being raised and lowered;

FIGS. 15A through 15F are views illustrating the operation of the media cartridge picker transporting the media cartridge inserted from the mail slot onto the turntable;

DESCRIPTION OF THE PREFERED EMBODIMENTS

Exemplary embodiments of the present invention are described hereinafter with reference to the accompanying drawings.

[First Embodiment]

A first embodiment is described in the following order.
1. Configuration and Operation Overview of Tape Cartridge Autoloader 100
2. Configuration of Tape Cartridge Picker 102
3. Operations of Turntable Lifting Mechanism 150
4. Operations of Tape Cartridge Picker 102
5. Barcode Reader Device
6. Wiring Path of Flexible Flat Cable 270

1 [Configuration and Operation Overview of Media Cartridge Autoloader 100]

Figure 1:
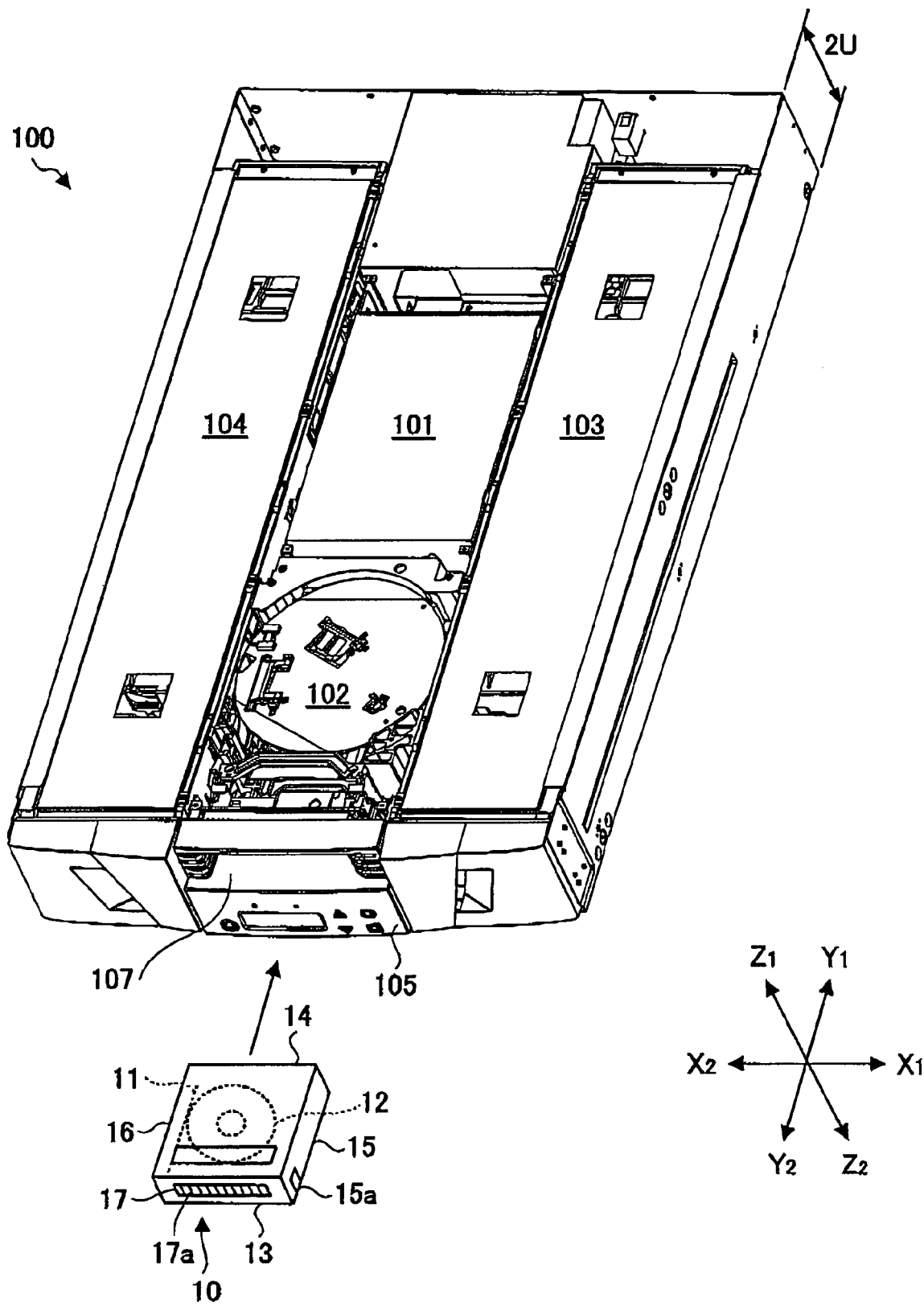
FIG. 1 is a perspective view illustrating a media cartridge autoloader with an upper cover thereof removed according to the first embodiment of the present invention.

FIG. 1 is a perspective view illustrating a media cartridge autoloader 100 with an upper cover thereof removed according to the first embodiment of the present invention. In the embodiments illustrated in the figures, the media cartridge autoloader is used with one or more tape cartridges, and is therefore referred to as a tape cartridge autoloader. It is recognized, however, that although the following description and the figures provided herein pertain particularly to an autoloader used for tape cartridges, any other suitable type of media cartridge can equally be used with the present invention, such as an optical disk cartridge, as one non-exclusive example. The embodiments disclosed herein are not intended to limit the scope of the present invention in any manner to use with tape cartridges or any other particular type of media. In other words, it is understood that the term "tape" as used herein can equally be substituted for the term "media".

Figure 2:
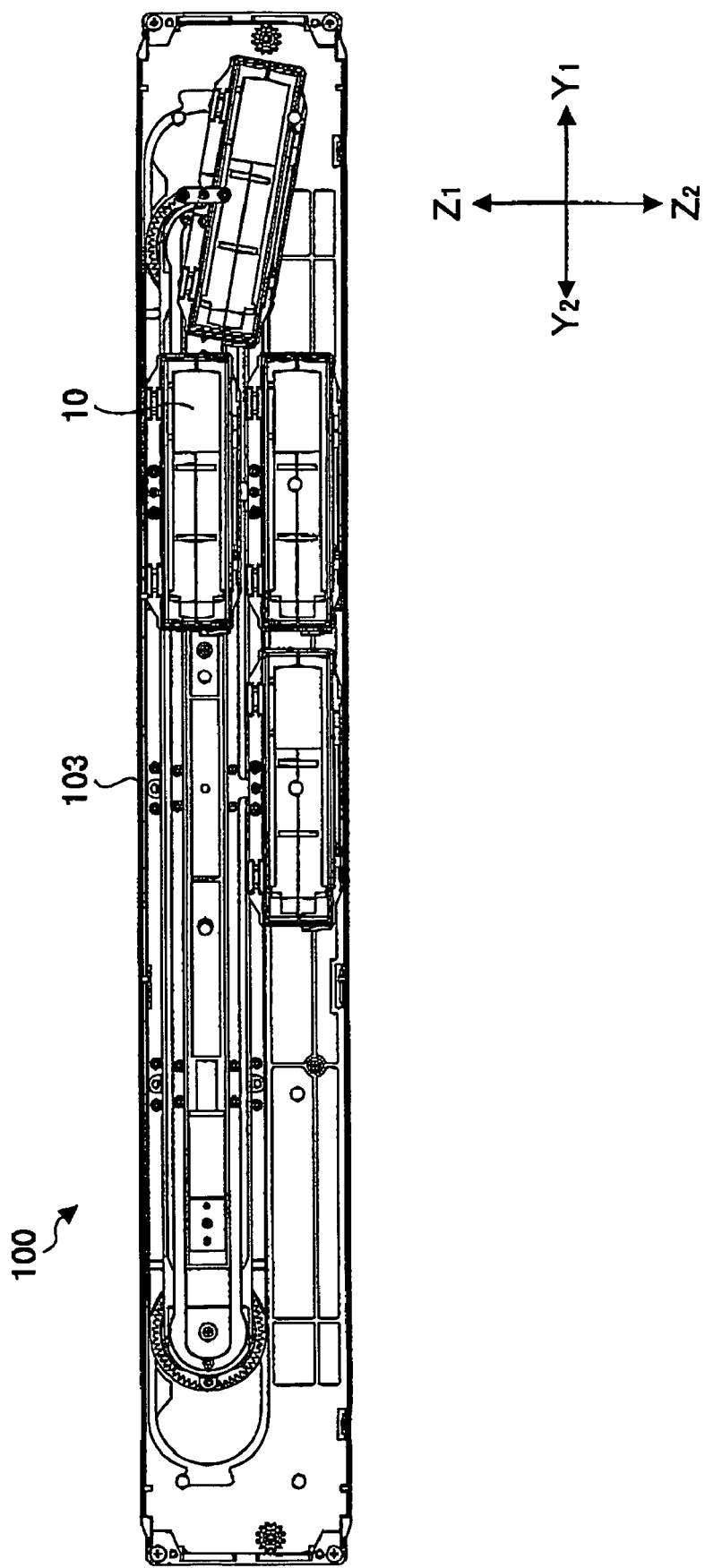
FIG. 2 is a side view illustrating the media cartridge autoloader with a side cover thereof removed.

FIG. 2 is a side view illustrating the tape cartridge autoloader 100 with a side cover thereof removed. Throughout the drawings, the width direction is indicated by a line X1–X2, the depth direction is indicated by a line Y1–Y2, and the height direction is indicated by a line Z1–Z2.

In the embodiment illustrated in FIG. 1, the tape cartridge autoloader 100 generally includes a control panel 105 and a mail slot 107, both on a front panel, a tape cartridge picker 102 at a position opposing the mail slot 107, first and second tape cartridge transport magazines 103 and 104 located one on each of the X1 side and the X2 side, and a tape drive 101 on the Y1 side of the tape cartridge picker 102. A suitable tape cartridge 10 is loaded in the tape cartridge autoloader 100. It is recognized that the specific locations and positioning of the above components of the tape cartridge autoloader 100 can be varied to suit the design requirements of the tape cartridge autoloader 100. Further, it is understood that either tape cartridge transport magazine 103, 104 can be the first tape cartridge transport magazine or the second tape cartridge transport magazine.

Referring to FIG. 1, the tape cartridge 10 includes a magnetic tape 11 wound on a single reel 12 therein such that the magnetic tape 11 is pulled out from a rear face of the tape cartridge 10. The tape cartridge 10 includes a front face 13, a rear face 14, side faces 15 and 16, and a notch 15a formed on the side face 15 which a cartridge pin (to be described below) engages.

The tape cartridge transport magazines 103 and 104 are each configured to store plural tape cartridges 10 with the front faces 13 opposing the tape cartridge picker 102. The tape cartridge transport magazines 103 and 104 are also configured to transport the tape cartridges 10 along a racetrack path elongated in the Y1–Y2 directions as shown in FIG. 2.

Figure 5:
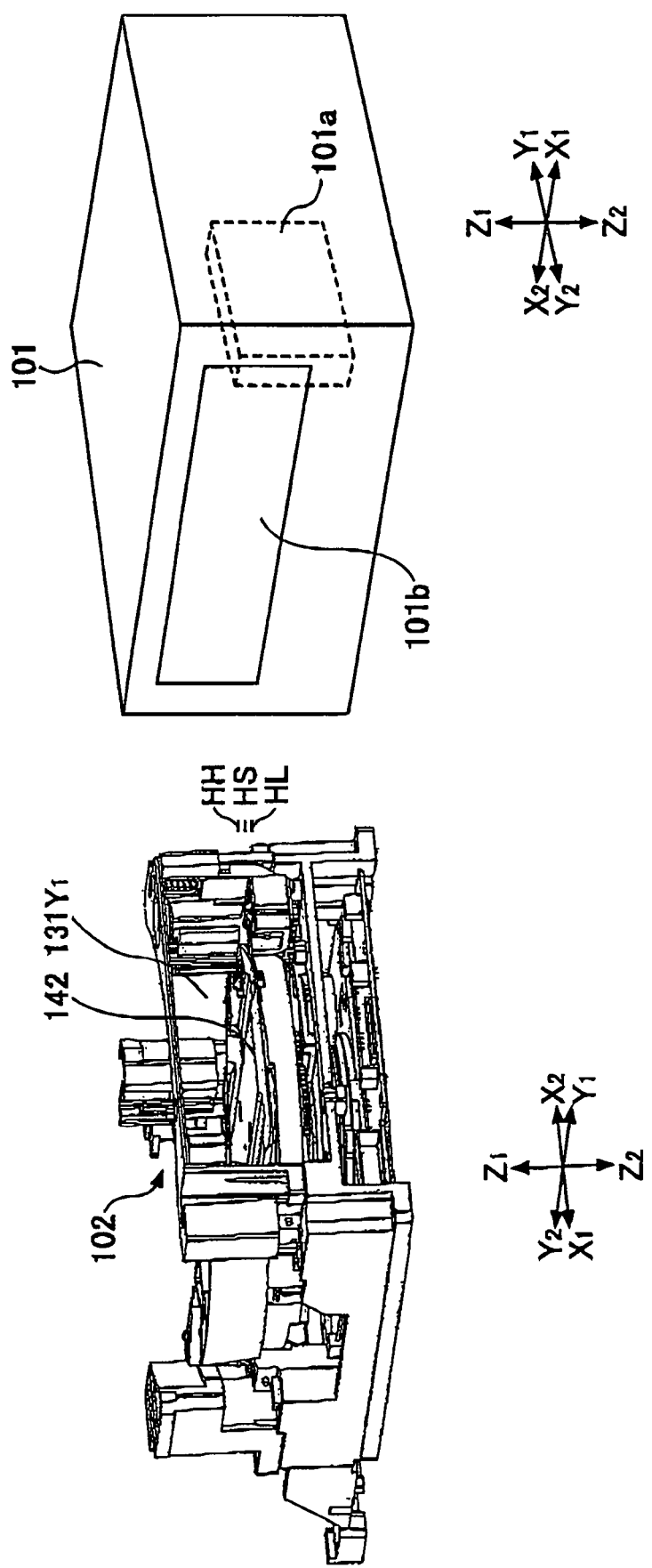
FIG. 5 is a perspective view illustrating the media cartridge picker opposing a media drive.

The tape drive 101 is operable to read and/or write data from or to the magnetic tape 11 pulled out from the loaded tape cartridge 10, The tape drive 101 includes a tape cartridge ejecting mechanism (shown in FIG. 5).

Figure 3:
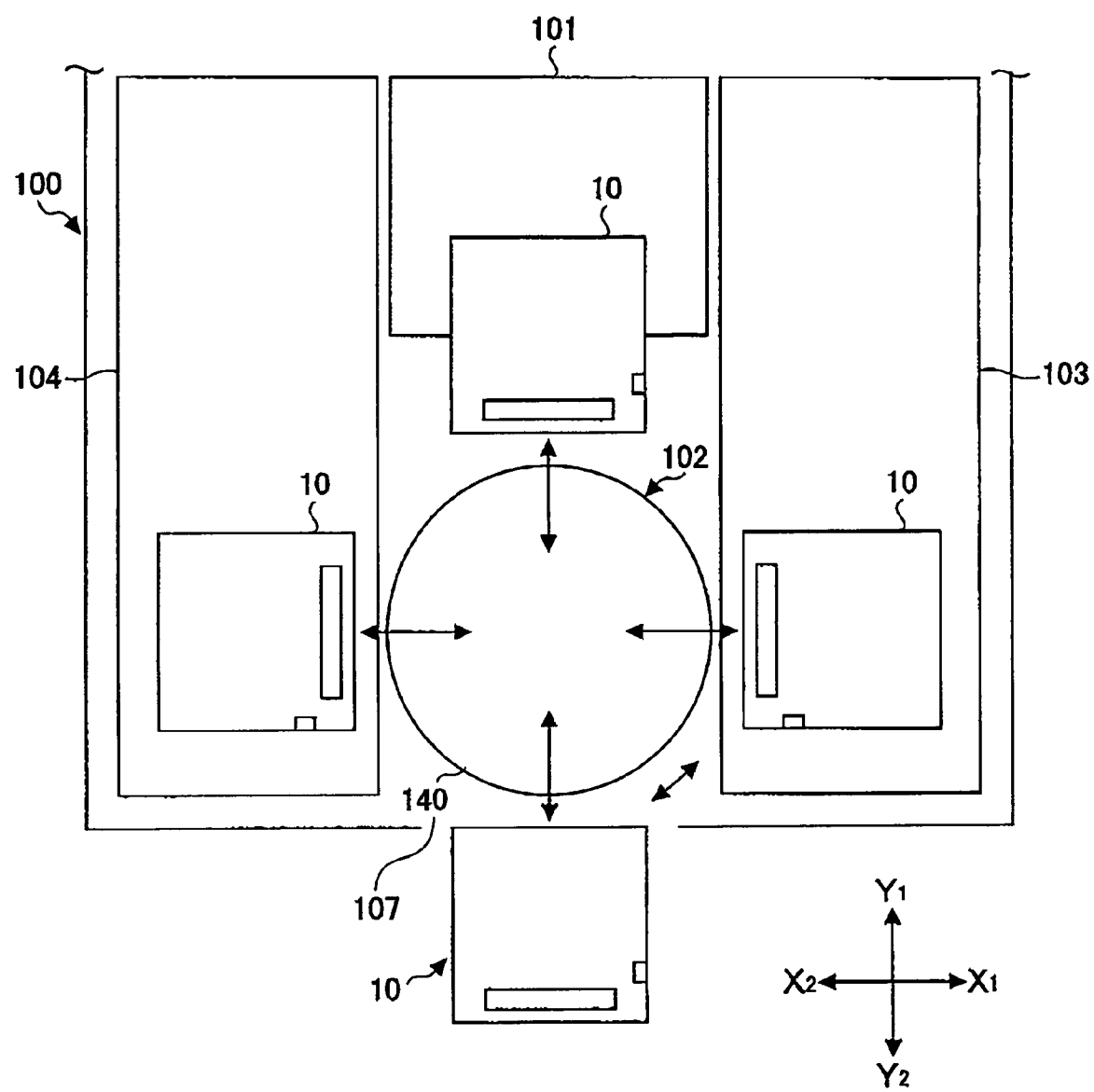
FIG. 3 is a schematic view illustrating operations of a media cartridge picker.

Referring to FIG. 3, the tape cartridge picker 102 is configured to transport the tape cartridge 10 onto and/or off of a turntable 140 for operations such as loading the tape cartridge 10 inserted through the mail slot 107 into the tape drive 101, retrieving the tape cartridge 10 from one or more of the tape cartridge transport magazines 103 and 104 to load the tape cartridge 10 into the tape drive 101, retrieving the tape cartridge from the tape drive 101 to return the tape cartridge 10 to one of the tape cartridge transport magazines 103 and 104, and ejecting the tape cartridge 10 through the mail slot 107. The tape cartridge picker 102 is also configured to rotate the turntable 140 in predetermined rotational increments, such as in increments of approximately 90 degrees, for example, although the predetermined rotational increment can be varied to suit the design requirements of the autoloader. The cartridge picker 102 can also raise/lower the turntable 140, as necessary. When the turntable 140 is rotated, the orientation of the tape cartridge 10 is changed.

It should be noted that plural makers produce a variety of tape drives. In certain embodiments, the tape cartridge picker 102 comprises a turntable lifting mechanism 150 that adjusts the positioning of the turntable 140 to the tape drives of any makers to be including within the tape cartridge autoloader 100.

2 [Configuration of Tape Cartridge Picker 102]

Figure 4:
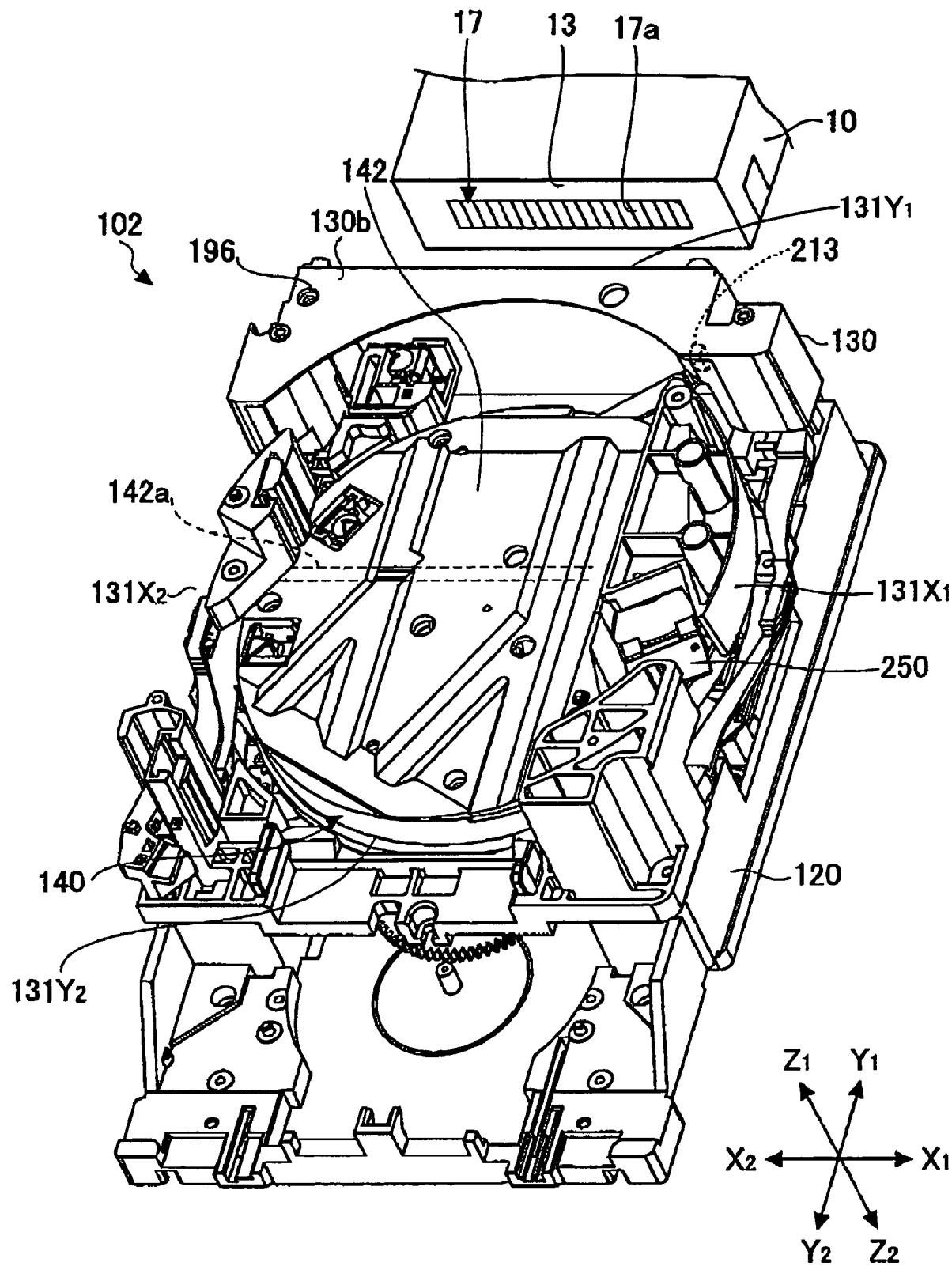
FIG. 4 is a perspective view illustrating the media cartridge picker.
Figure 6:
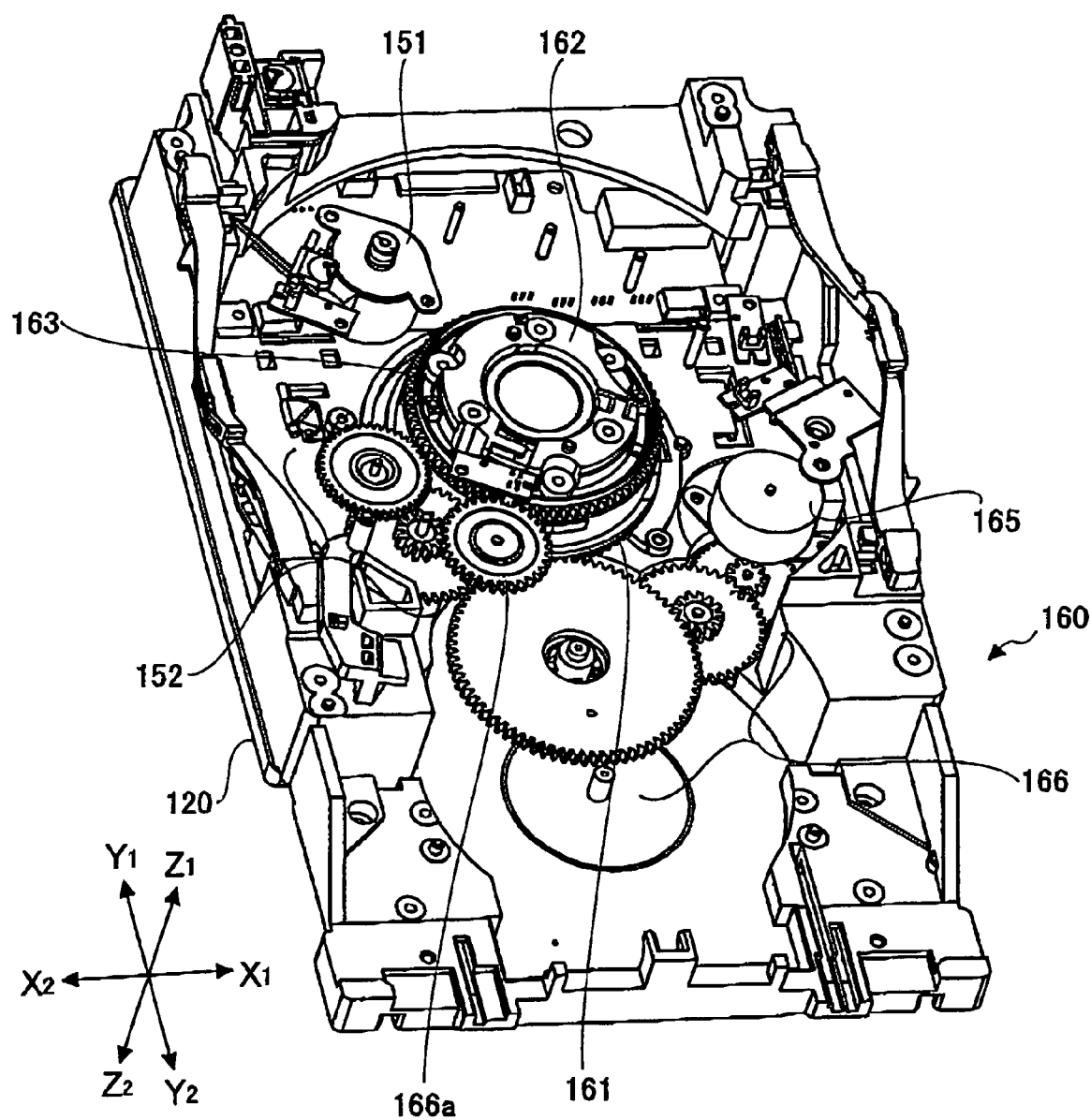
FIG. 6 is a perspective view illustrating the media cartridge picker and a part of the media cartridge autoloader with a pillar, the turntable and a sub chassis removed.
Figure 7:
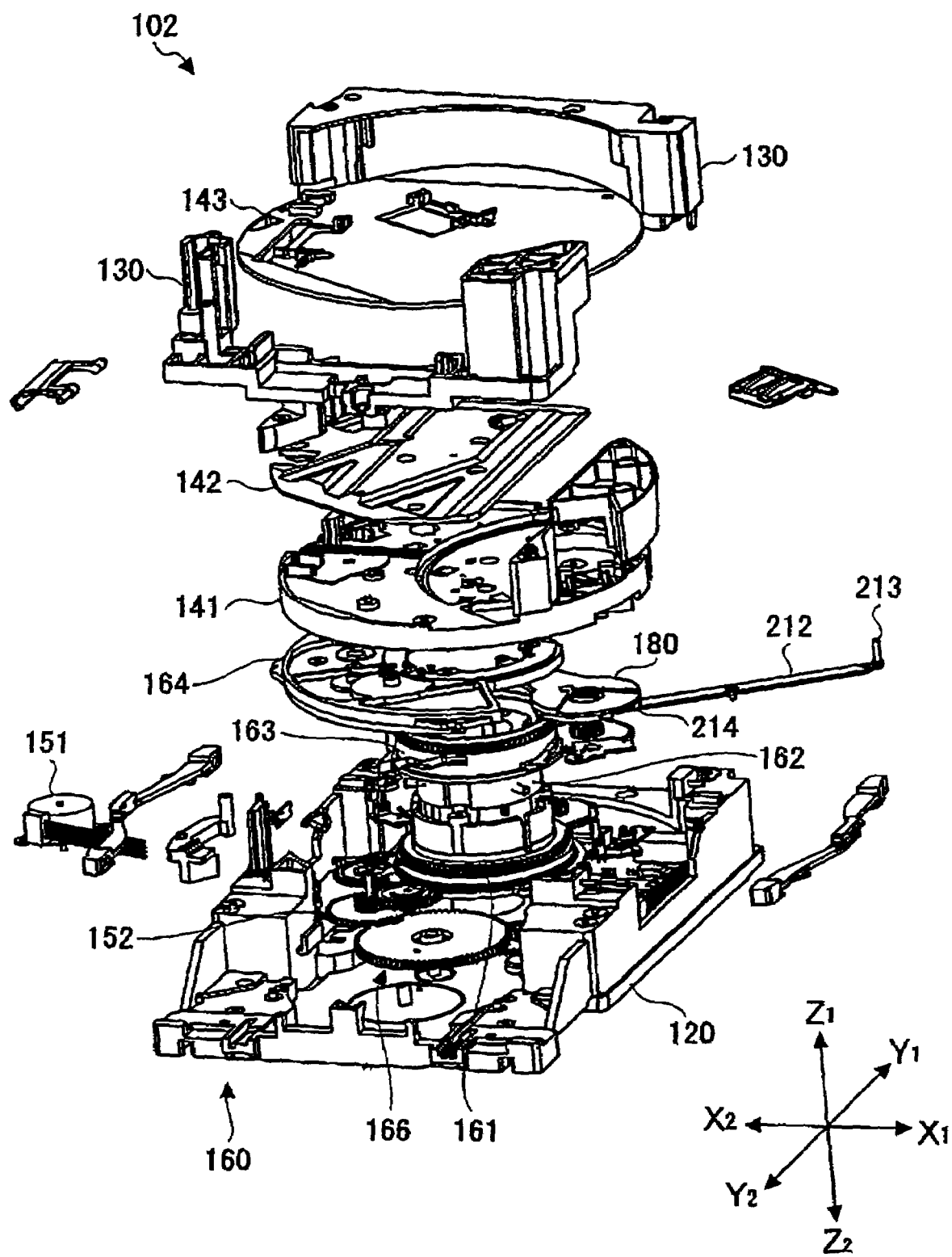
FIG. 7 is an exploded perspective view illustrating the media cartridge picker.
Figure 8:
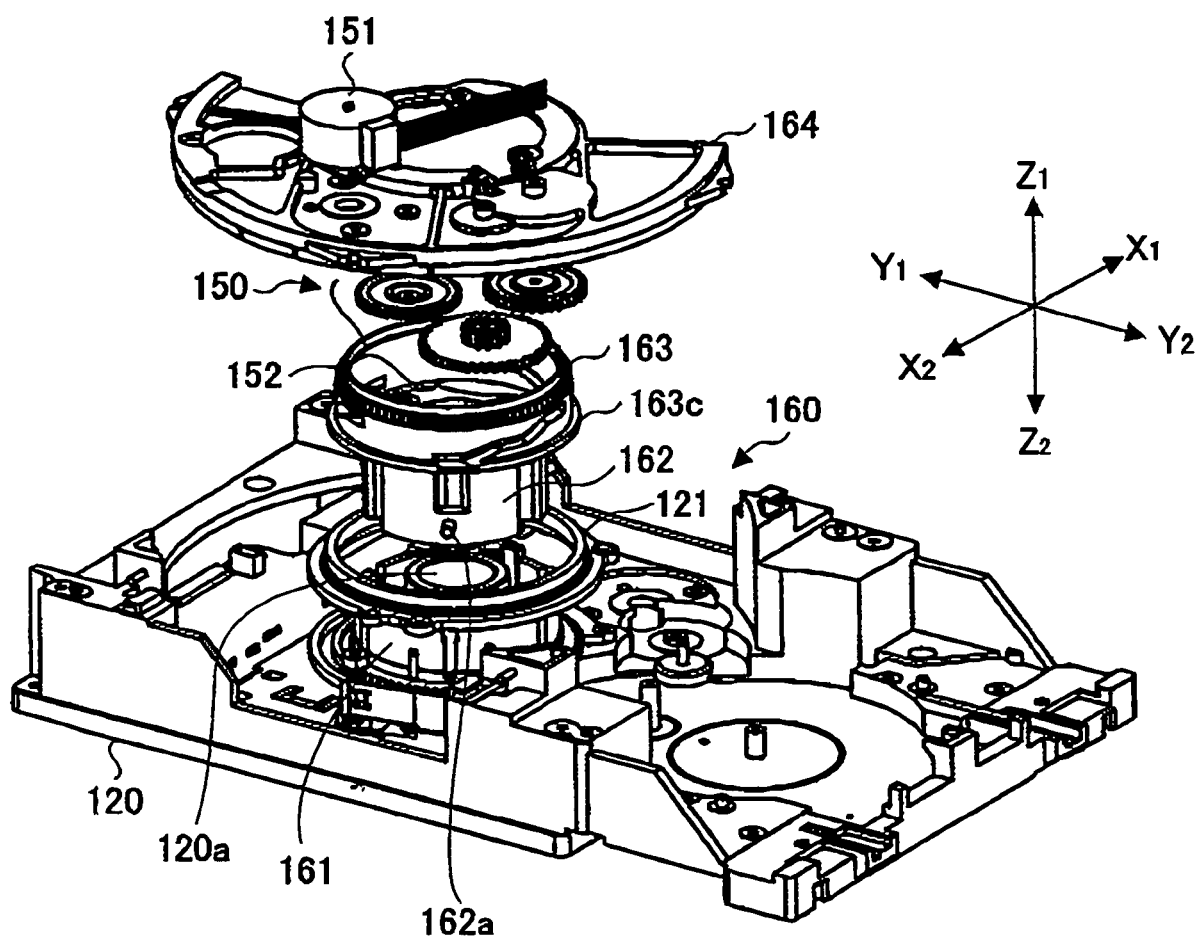
FIG. 8 is an exploded perspective view illustrating the turntable lifting mechanism shown in FIG. 7 in detail.

FIG. 4 illustrates the tape cartridge picker 102 with an upper plate 143 of the turntable 140 removed. FIG. 5 illustrates the tape cartridge picker 102 opposing the tape drive 101. FIG. 6 illustrates the tape cartridge picker 102 with a pillar 130 and the turntable 140 removed. FIG. 7 is an exploded perspective view illustrating the tape cartridge picker 102. FIG. 8 illustrates the turntable lifting mechanism 150 in detail.

The tape cartridge picker 102 includes a base 120, the pillar 130 mounted on the base 120, the turntable 140 (FIG. 9) configured to support the tape cartridge 10, the turntable lifting mechanism 150 configured to slightly raise and lower the turntable 140 for height position adjustment, and a turntable rotating mechanism 160 configured to rotate the turntable 140 at a predetermined rotational increment, such as approximately every 90 degrees, for example. The tape cartridge picker 102 has ports 31X1, 131X2, 131Y1, and 131Y2 on four sides thereof.

Figure 11:
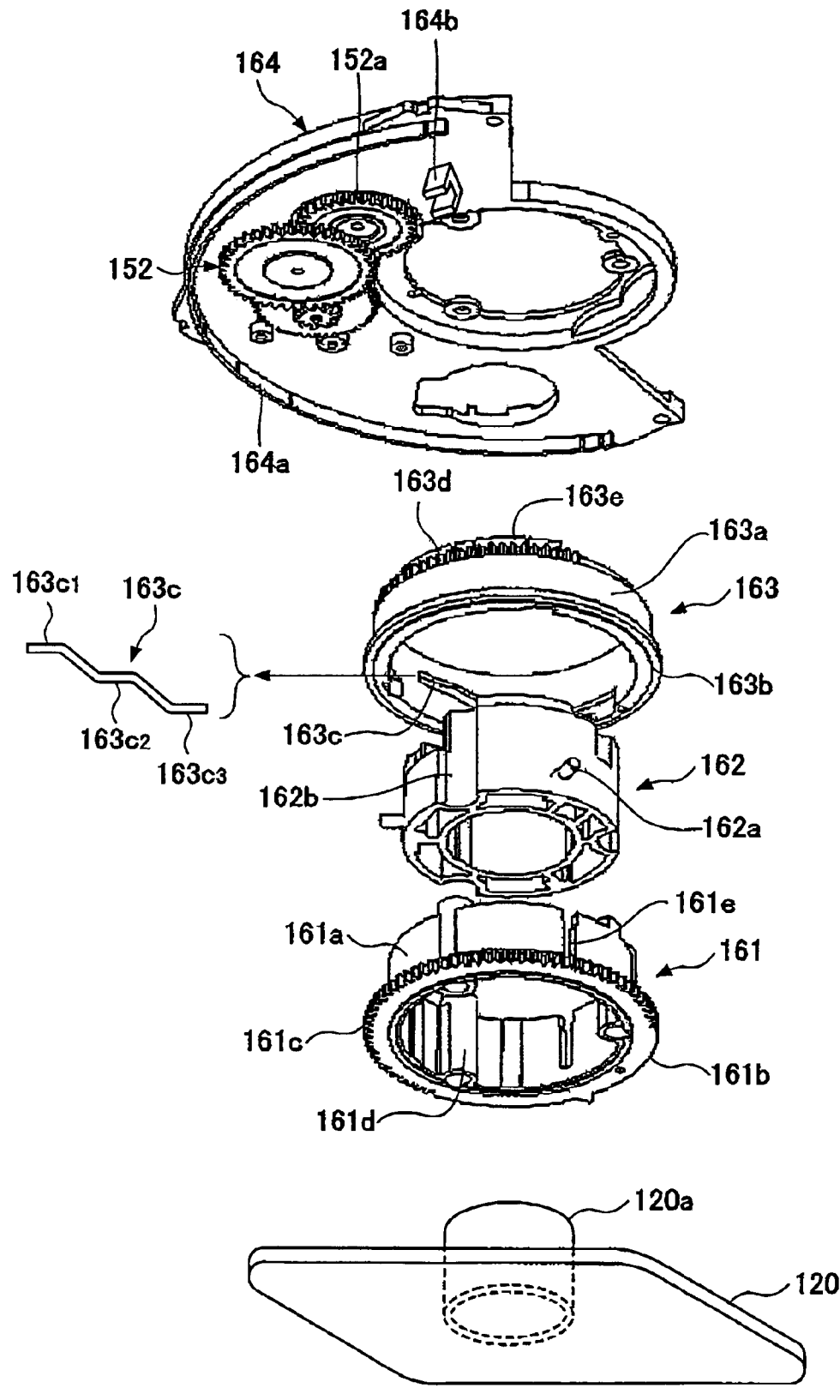
FIG. 11 is an exploded view illustrating the under part of the mechanism of the turntable.
Figure 12:
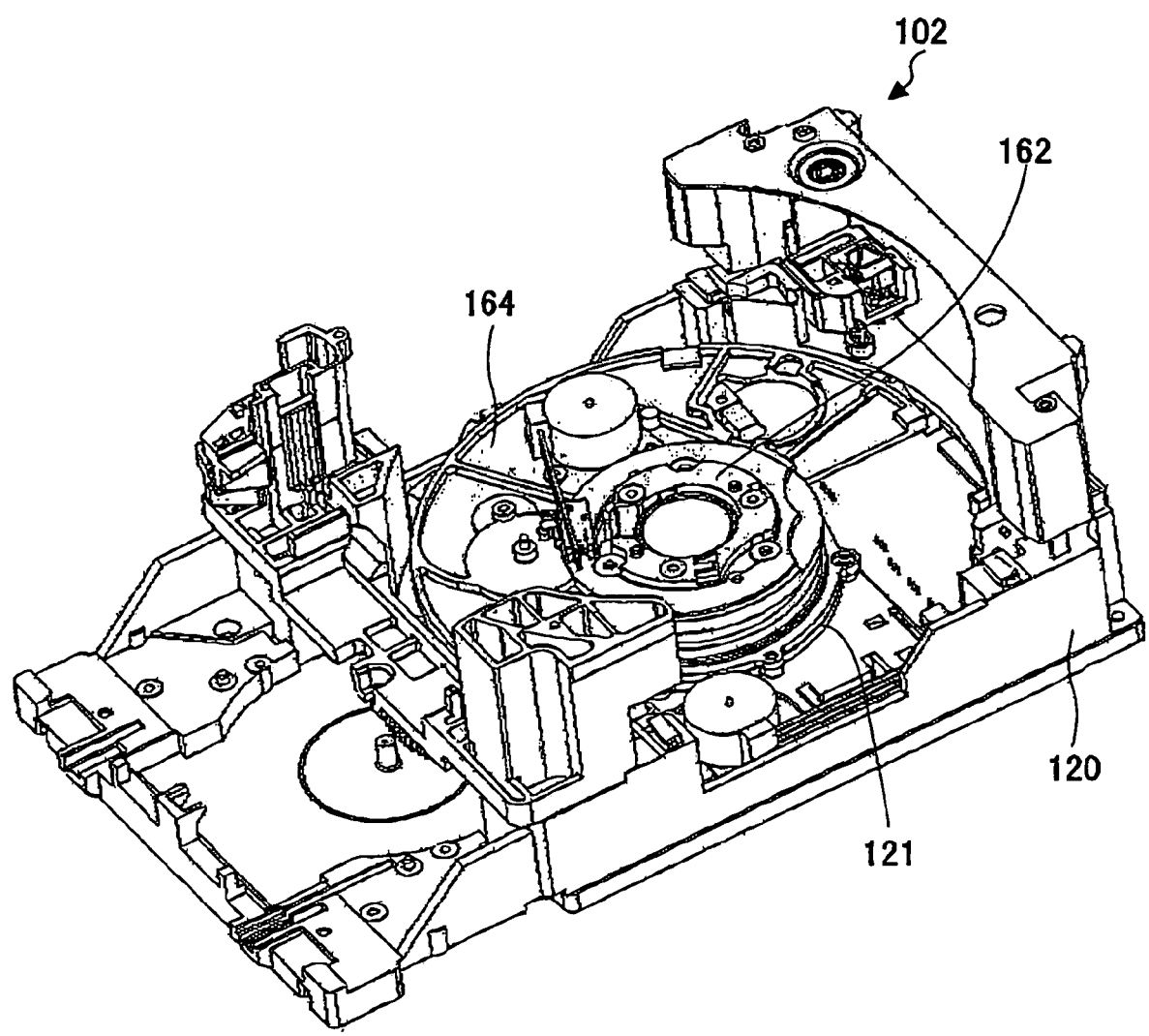
FIG. 12 is a perspective view illustrating the media cartridge picker with the turntable removed.
Figure 13:
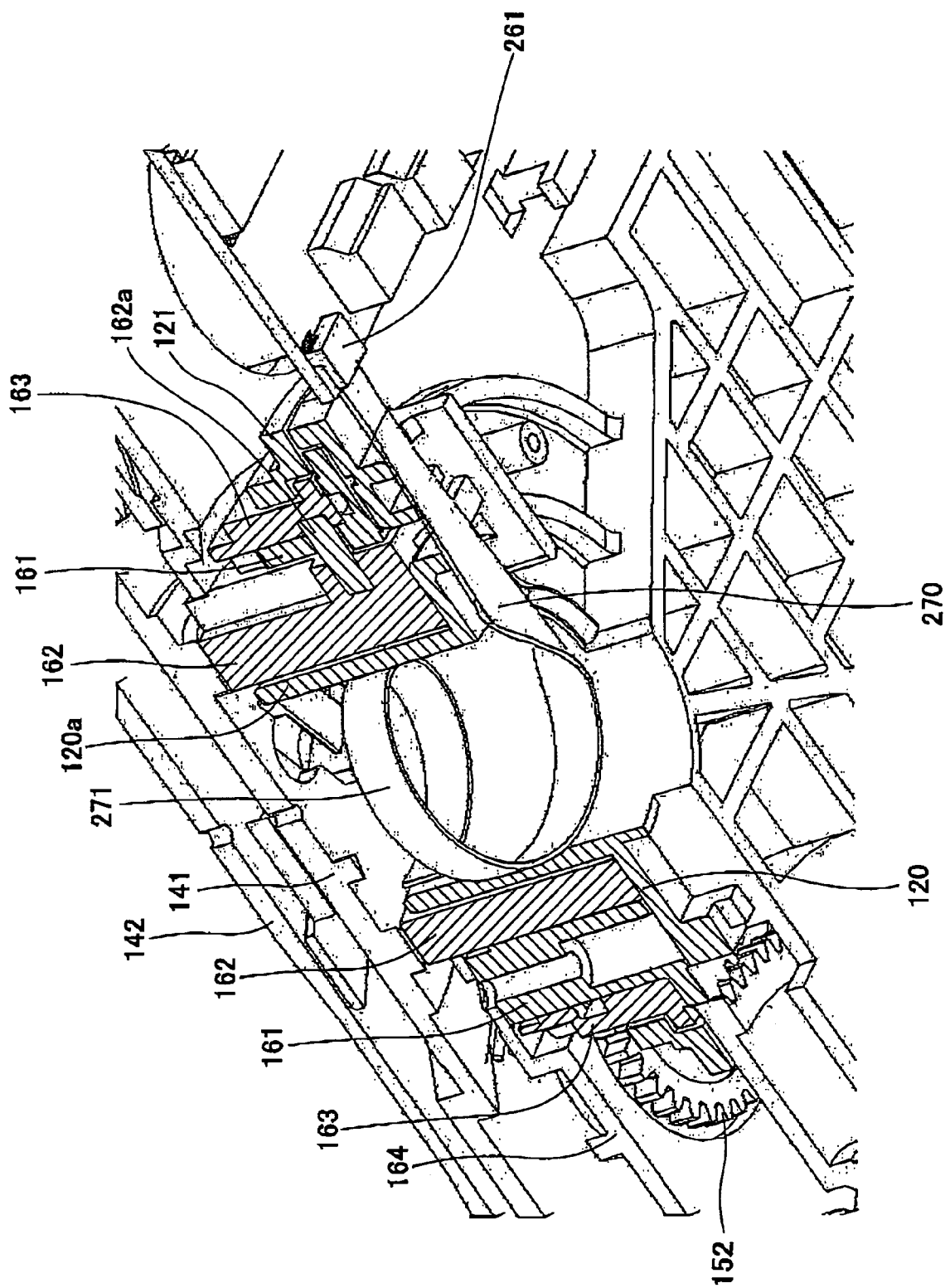
FIG. 13 is a cross-sectional view within a perspective view illustrating the turntable of the media cartridge picker and the under side thereof.

As shown in FIGS. 11–13 together, a rotating ring gear 161, a cylindrical stand 162, a lifting ring gear 163, and a sub base 164 are disposed on the base 120.

Referring to FIG. 11, the base 120 includes a cylindrical section 120a protruding in the Z1 direction. In one embodiment, the rotating ring gear 161 having substantially a cylindrical shape includes another cylindrical section 161a, a flange portion 161b on the Z2 side of the cylindrical section 161a, a gear section 161c around the flange portion 161b, a columnar section 161d protruding inside of the cylindrical section 161a, and a slit 161e extending in the Z direction in the cylindrical section 161a.

In the embodiment illustrated in FIG. 11, the cylindrical stand 162 includes a boss 162a protruding from the outside edges of the cylindrical stand 162 and a concave section 162*b* extending in the Z direction on the outside edges of the cylindrical stand 162.

Further in FIG. 11, the lifting ring gear 163 can have a substantially cylindrical shape and can include a third cylindrical section 163*a*, a flange portion 163*b* on the Z2 side of the cylindrical section 163*a*, a slant groove 163*c* formed on the inside edges of the cylindrical section 163*a*, a gear section 163*d* on the upper end of the outside edges of the cylindrical section 163*a*, and a flag 163*e* formed on the upper end of the cylindrical section 163*a*. The slant groove 163*c* as enlarged in FIG. 11 includes a groove portion 163*c*1 at a high position, a groove portion 163*c*3 at a low position, and a groove portion 163*c*2 at a middle position.

In this embodiment, the sub base 164 can be a semicircular plate in which a flag 164*a* is formed on the periphery of the sub base 164. In this embodiment, on the under side of the sub base 164, a stepping motor 151 (FIG. 6), a gear train 152 communicating a rotation of the stepping motor 151, and a photo sensor 164*b* are provided. As described below, an edge gear 152*a* of the gear train 152 engages a gear section 163*d*. The photo sensor 164*b* can fit over the flag 163*e*.

Referring to FIGS. 7, 8 and 11–13, the cylindrical stand 162 can rotatably fit on the cylindrical section 120*a* on the base 120. The rotating ring gear 161 engages the outside of the cylindrical stand 162. The columnar section 161*d* engages the concave section 162*b*. The boss 162*a* fits into the slit 161*e*. When the rotating ring gear 161 is rotated, the cylindrical stand 162 can be rotated together with the rotation ring gear 161 in a unified manner. It should be noted that in one embodiment, the cylindrical stand 162 can be raised and lowered independently of the rotating ring gear 161. The gear section 161*c* engages a gear 166*a* of a gear train 166 (described below).

Further, in this embodiment, the lifting ring gear 163 rotatably engages the outside of the rotating ring gear 161. The slant groove 163*c* fits against the tip end of the boss 162*a*. The flange portion 163*b* is provided on the flange portion 161*b*. A clump member 121 having a ring shape covers the flange portion 163*b* and is screwed onto the base 120 so as to regulate the movement of the lifting ring gear 163 and the rotating ring gear 161 in the Z1 direction and support the lifting ring gear 163 and the rotation ring gear 161 on the base 120. When the lifting ring gear 163 is rotated, the slant groove 163*c* applies a displacing force to the boss 162*a*. Then, the boss 162*a* moves vertically in the slit 161*e*. The cylindrical stand 162 is raised and lowered independently of the rotating ring gear 161 facilitated by the concave section 162*b* moving vertically along the columnar section 161*d*.

The central side of the sub base 164 is screwed onto the upper surface of the cylindrical section 161*a* of the rotating ring gear 161. The gear 152*a* engages, e.g., meshes with, the gear section 163*d*. The photo sensor 164*b* fits over the flag 163*e*. The sub base 164 is rotated together with the rotating ring gear 161 in a unified manner.

Figure 9:
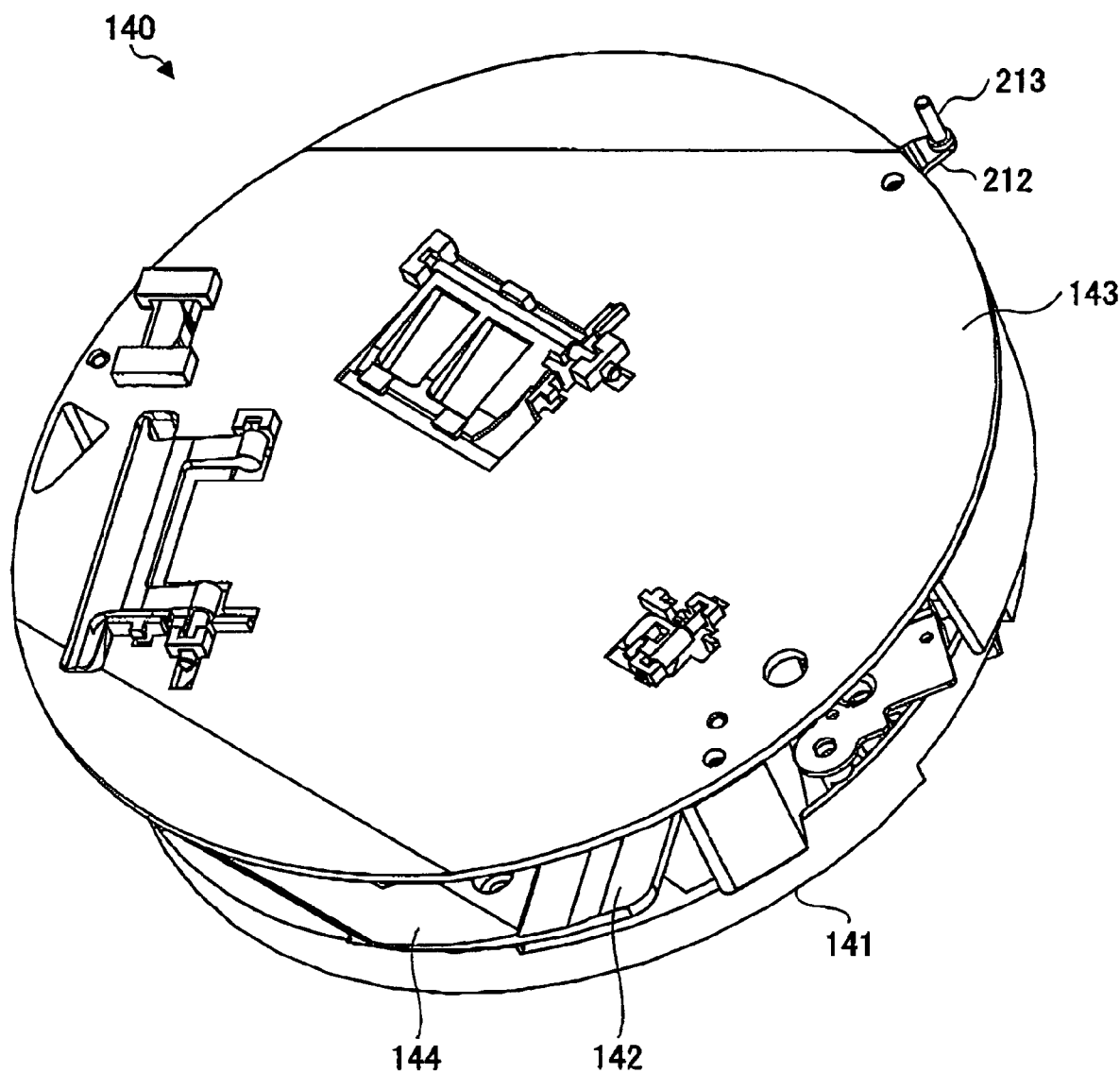
FIG. 9 is a perspective view illustrating the turntable.

Referring to FIG. 9, the turntable 140 includes a base plate 141, a floor plate 142, the upper plate 143, and a clearance 144 between the floor plate 142 and the upper plate 143 to receive the tape cartridge 10. The base plate 141 is screwed onto the cylindrical stand 162.

Referring to FIG. 8, the lifting mechanism 150 includes a stepping motor 151, a gear train 152, and the lifting ring gear 163. Both the stepping motor 151 and the gear train 152 are provided on the sub base 164.

As shown in FIG. 6, the turntable rotating mechanism 160 includes a stepping motor 165, a gear train 166, and the rotating ring gear 161, all of which are provided on the base 120.

The lifting mechanism 150 has a function of initializing the turntable 140 by raising/lowering the turntable 140 to a home position thereof in the Z direction. The turntable rotating mechanism 160 has a function of initializing the turntable 140 by rotating the turntable 140 to the home position in the rotation direction. The home position of the turntable 140 is a position where a y-axis (to be described later) becomes parallel to the Y-axis. This lifting mechanism initialization operation and the turntable rotating mechanism initialization operation apply a method of moving an object to an operation end position defined as a reference position, and then moving the object back by a predetermined distance. The same method is applied to operations for initializing a tape cartridge transport mechanism 170 (described below).

Figure 10:
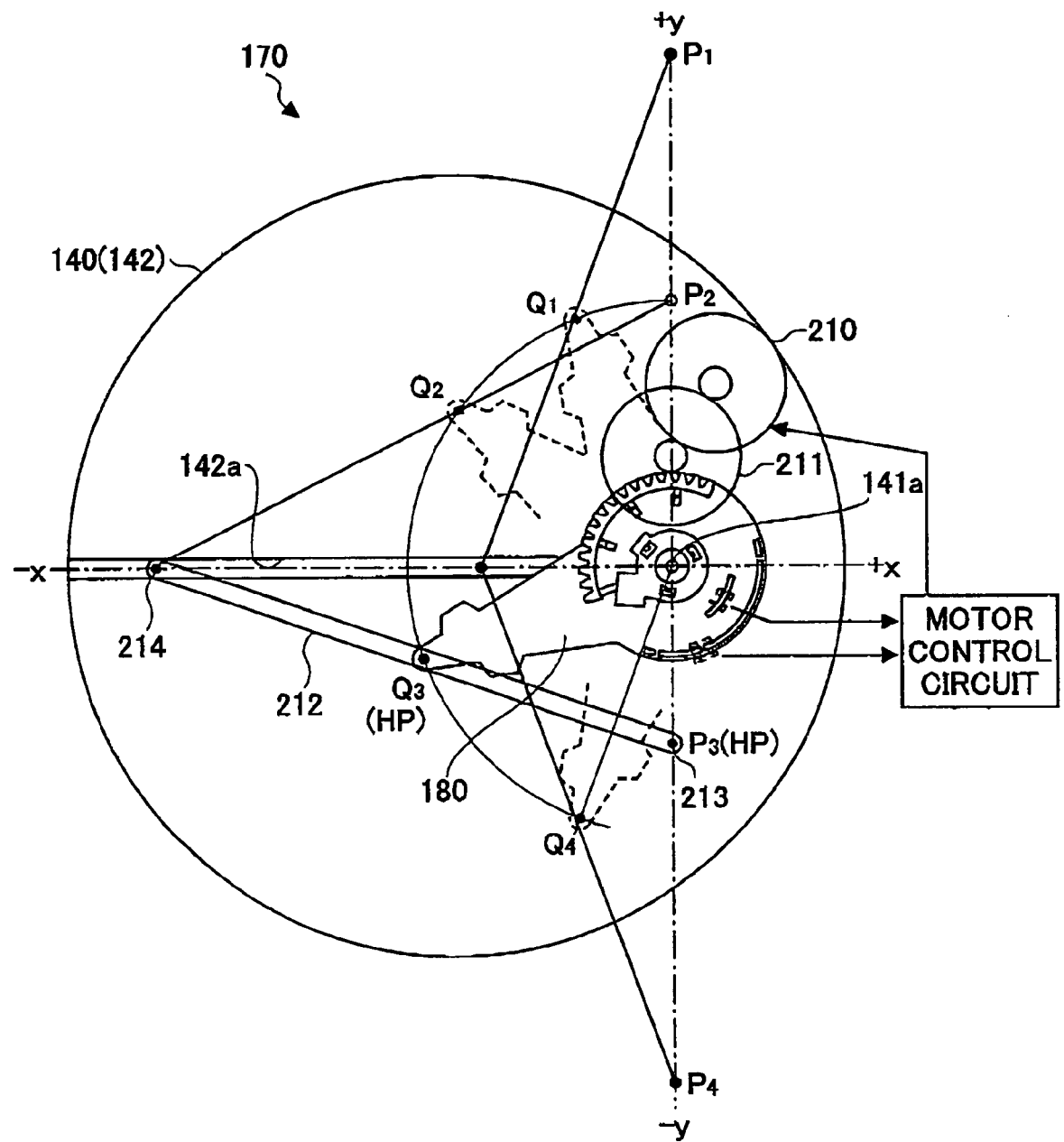
FIG. 10 is a schematic view illustrating a media cartridge transport mechanism.

Referring to FIG. 10, for the sake of explanation, the turntable 140 applies coordinates wherein the position of a pin 141*a* (to be described below) is defined as the origin, a guide groove 142*a* (to be described below) is defined as an x-axis, and an axis passing through the origin and being orthogonal to the x-axis is defined as a y-axis.

A tape cartridge transport mechanism 170 and a stepping motor 210 (to be described later), both shown in FIG. 10, are provided on the base plate 141.

The tape cartridge transport mechanism 170 has a function of moving the tape cartridge 10 between a position on the turntable 140, i.e., a position in the clearance 144, and a position outside of the tape cartridge picker 102. In one embodiment, the movement of the tape cartridge 10 is substantially linearly. In alternative embodiments, the movement of the tape cartridge can be non-linear or can combine linear and non-linear movements. The tape cartridge transport mechanism 170 includes a rotary arm 180 rotatably attached to the pin 141*a* formed on the base plate 141, the stepping motor 210 (FIG. 10) configured to reciprocally rotate the rotary arm 180 between positions Q1 and Q4 within a predetermined angular range, a reduction gear mechanism 211 configured to transmit the rotation of the motor 210 at a reduced rotation rate to the rotary arm 180, and a lever 212 with a center part rotatably connected to a tip end of the rotary arm 180. A cartridge pin 213 can be vertically fixed to an end of the lever 212, while a pin 214 can be fixed to the other end of the lever 212. The pin 214 engages a guide groove 142*a* formed on a lower face of the floor plate 142. In one embodiment, the guide groove 142*a* is substantially linear. However, in an alternative embodiment (not shown), the guide groove 142*a* can be non-linear.

Referring to FIG. 10, when the motor 210 is driven, the rotary arm 180 is rotated through the reduction gear mechanism 211. Then, the pin 214 is moved within the guide groove 142*a* along the x-axis, and the lever 212 is rotated so that the cartridge pin 213 moves substantially linearly between positions P1 and P4 along the y-axis.

When the rotary arm 180 is rotated from the position Q1, to Q2, to Q3 and to Q4, the cartridge pin 213 is correspondingly moved from the position P1, to P2, to P3 and to P4.

3 [Operations of Turntable Lifting Mechanism 150]

Referring to FIG. 8, when the stepping motor 151 is driven and rotated in the normal direction, the lifting ring gear 163 is rotated in the middle arrow head CW direction (in the clockwise direction) shown in FIG. 14A via the gear train 152. The slant groove 163*c* applies a displacing force to the boss 162a, and thereby, the boss 162a moves upward in the slit 161e (FIG. 11). In the cylindrical stand 162, the concave section 162b moves along the columnar section 161d. The concave section 162b is raised in the Z1 direction independently of the rotating ring gear 161 as shown in FIG. 14B so as to raise the turntable 140.

When the stepping motor 151 is driven and rotated in the reverse direction, the lifting ring gear 163 is rotated in the counterclockwise direction via the gear train 152. The slant groove 163c applies a displacing force to the boss 162a, and thereby, the boss 162a moves downward in the slit 161e. In the cylindrical stand 162, the concave section 162b moves along the columnar section 161d. The concave section 162b is lowered in the Z2 direction independently of the rotating ring gear 161.

Here, the slant groove 163c comprises a groove portion 163c1 at a high position, a groove portion 163c3 at a low position and a groove portion 163c2 at a middle position. Accordingly, in a state where the groove portion 163c2 guides the boss 162a, the turntable 140 is at a height of HS which is a standard position (as shown in FIG. 5). In a state where the groove portion 163c1 guides the boss 162a, the turntable 140 is at a height of HH which is higher than the standard position (as shown in FIG. 5). In a state where the groove 163c3 guides the boss 162a, the turntable 140 is at a height of HL which is lower than the standard height (as shown in FIG. 5). In other words, the height of the turntable 140 can be changed in three steps. Alternatively, the slant groove 163c can include greater than or fewer than the three identified portions 163c1, 163c2, 163c3, to provide greater or fewer height adjustment options during height adjustment of the turntable 140.

Accordingly, regardless of the manufacturer of the tape drive 101, the tape drive 101 can be mounted without change. Even if the height of the tape cartridge inserting slot is at a low position, the height of the turntable 140 can be lowered at a position HLH which is lower than the standard height (as shown in FIG. 5). Thus, it is not necessary to mount the tape drive at a high position by putting a stand under the tape drive. Therefore, the height of the tape cartridge autoloader 100 can be controlled in the range of approximately 2U as shown in FIG. 1 to meet customers' needs.

It should be noted that the rotating position of the lifting ring gear 163 is monitored by the photo sensor 164b reading the flag 163e.

In addition, the above described slant groove 163c can be a simple oblique groove. In this case, the height of the turntable 140 can be changed freely.

4 [Operations of Tape Cartridge Picker 102]

One embodiment of the operations of pulling the tape cartridge 10 inserted from the mail slot 107 onto the turntable 140 and mounting the tape cartridge 10 on the tape drive 101 is performed as shown in FIGS. 15 and 16.

In a state shown in FIG. 15A, the turntable 140 is at a standard height. FIGS. 15A through 15F show operations of pulling the tape cartridge 10 inserted from the mail slot 107 onto the turntable 140. The cartridge pin 213 engages the notch 15a. Then, the tape cartridge transport mechanism 170 is driven so that the tape cartridge 10 is pulled onto the turntable 140.

When the tape cartridge 10 is pulled onto the turntable 140, the turntable lifting mechanism 150 operates accordingly so as to adjust the height of the turntable 140 corresponding to the height of the tape cartridge inserting slot 101b of the tape drive 101 as shown in FIG. 5.

Figure 16A:
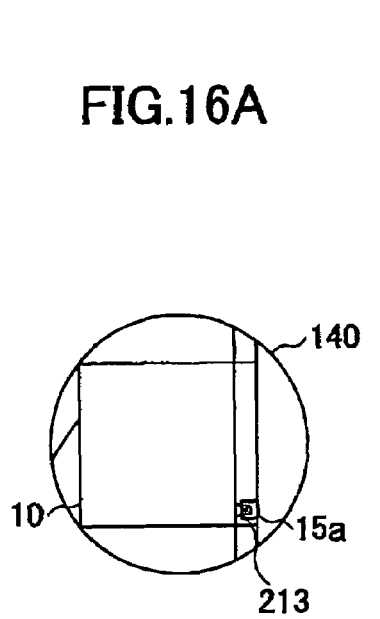
FIGS. 16A through 16F are views illustrating the operation of the media cartridge picker moving the media cartridge from the turntable to the media drive.
Figure 16D:
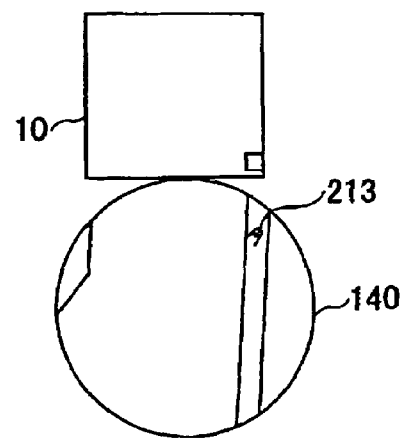
Figure 16B:
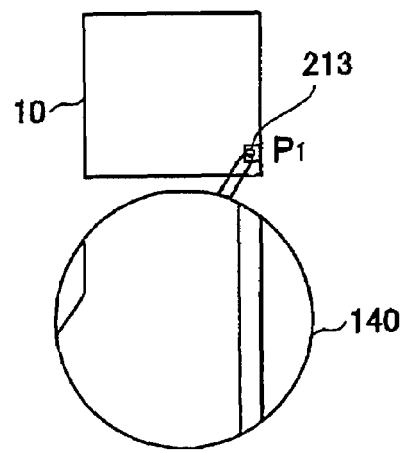
Figure 16E:
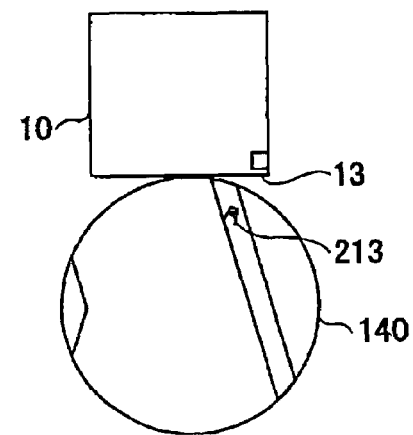
Figure 16C:
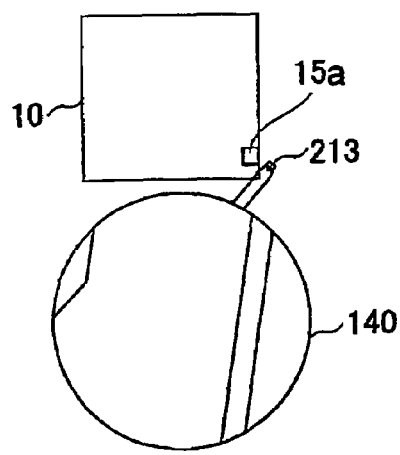
Figure 16F:
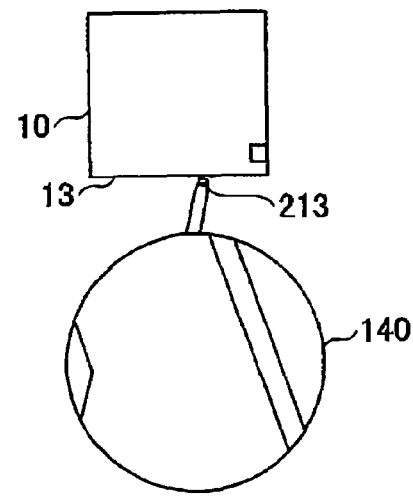

FIGS. 16A through 16F show operations of sending the tape cartridge 10 pulled onto the turntable 140 and mounting the tape cartridge 10 on the tape drive 101. The tape cartridge transport mechanism 170 operates so as to move the tape cartridge 10 in the Y1 direction. Finally, the cartridge pin 213 pushes the front side 13 of the tape cartridge 10 (as shown in FIG. 16F). Accordingly, the tape cartridge 10 is inserted into the tape cartridge inserting slot 101b and mounted on the tape drive 101.

If a tape drive of another maker is mounted as the tape drive 101, the turntable lifting mechanism 150 adjusts the height of the turntable 140 corresponding to the height of the tape cartridge inserting slot of the tape drive of the above described other maker.

5 [Barcode Reader Device]

Referring to FIGS. 1 and 4, a barcode label 17 is put on the front side 13 of the tape cartridge 10. On the barcode label 17, a barcode 17a indicating contents of the tape cartridge 10 such as a consecutive number is printed. The tape cartridge picker 102 comprises a barcode reader 250. The barcode reader 250 reads the barcode 17 so as to manage the tape cartridge 10 used in the tape cartridge autoloader 100 itself.

Figure 17:
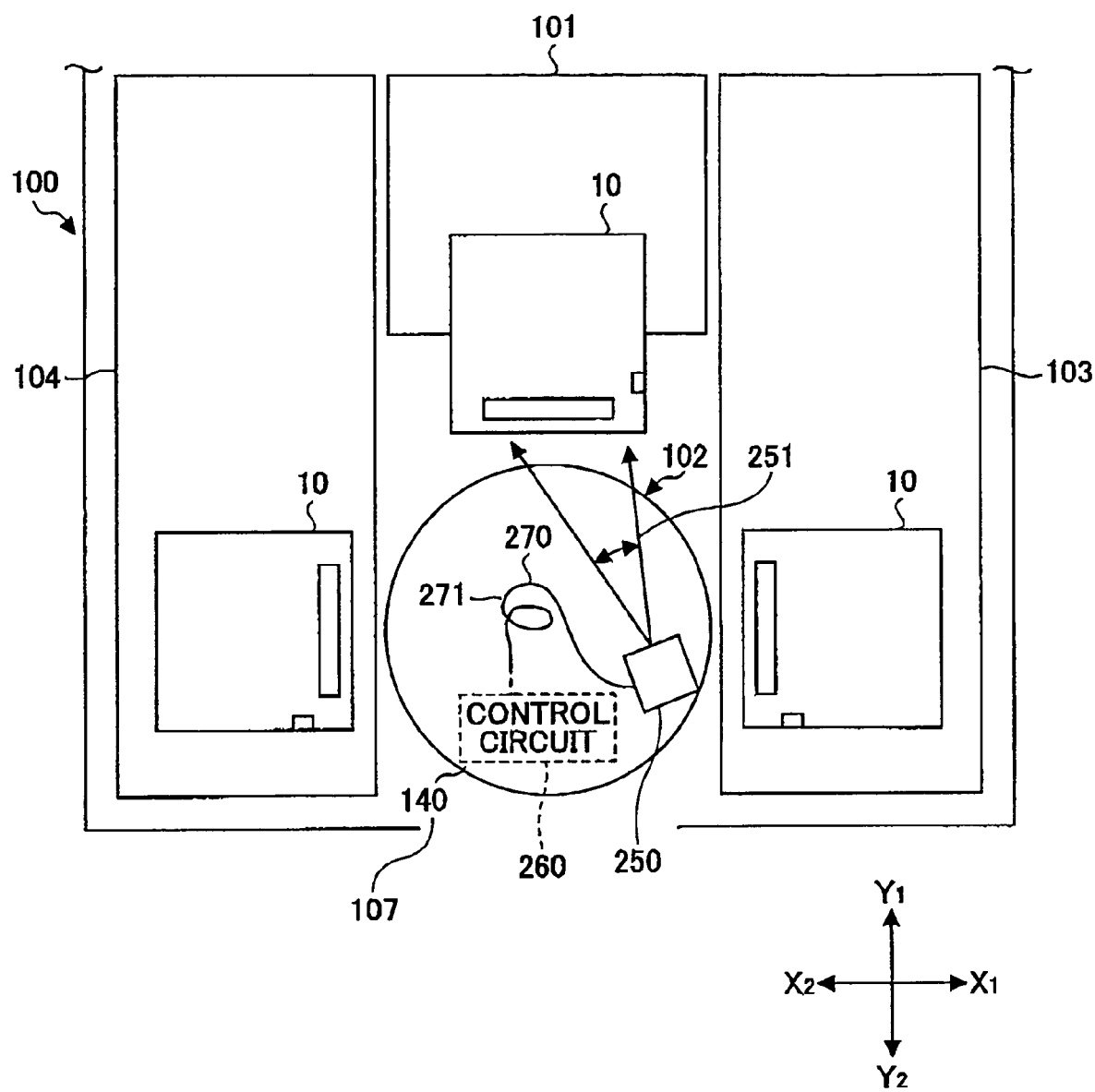
FIG. 17 is a schematic view illustrating a barcode reader reading the barcode of the media cartridge on the media drive side.
Figure 18A:
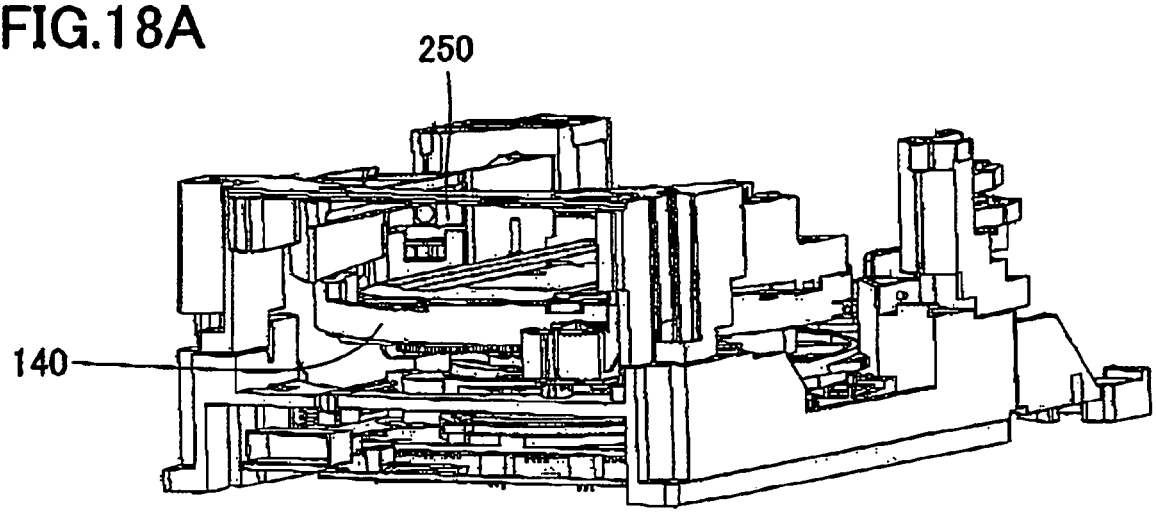
FIGS. 18A through 18C are views illustrating the scanning position of the beam on the barcode being shifted by changing the height of the barcode reader.

Referring to FIGS. 4, 17 and 18A, the barcode reader 250 is mounted on the base plate 141 of the turntable 140.

Referring to FIG. 17, a control circuit 260 which specifically can be part of a microcomputer is installed on the under surface of the base 120 or at another suitable location of the tape cartridge picker 102. A flexible flat cable (FFC) 270 extending from the barcode reader 250 is connected to the control circuit 260.

FIGS. 4 and 17 show where a barcode of the tape cartridge 10 ejected from the tape drive 101 is read. The barcode reader 250 is positioned facing the port 131Y1. The barcode reader emits a scanning beam 251. The beam 251 scans along the line 256M in FIG. 18B, and thus, the barcode reader 250 reads the barcode 17a.

Here, it should be noted that the barcode label 17 may include a crack section 18 and a blur section 19. These may cause an error in reading the barcode.

Figure 18B:
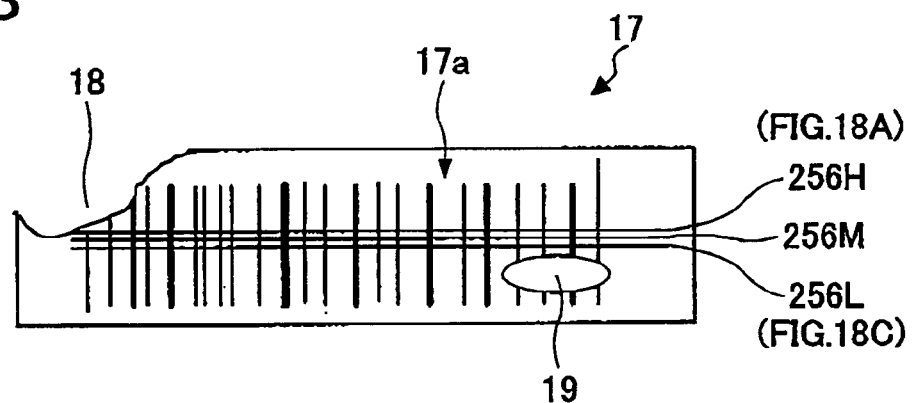
Figure 18C:
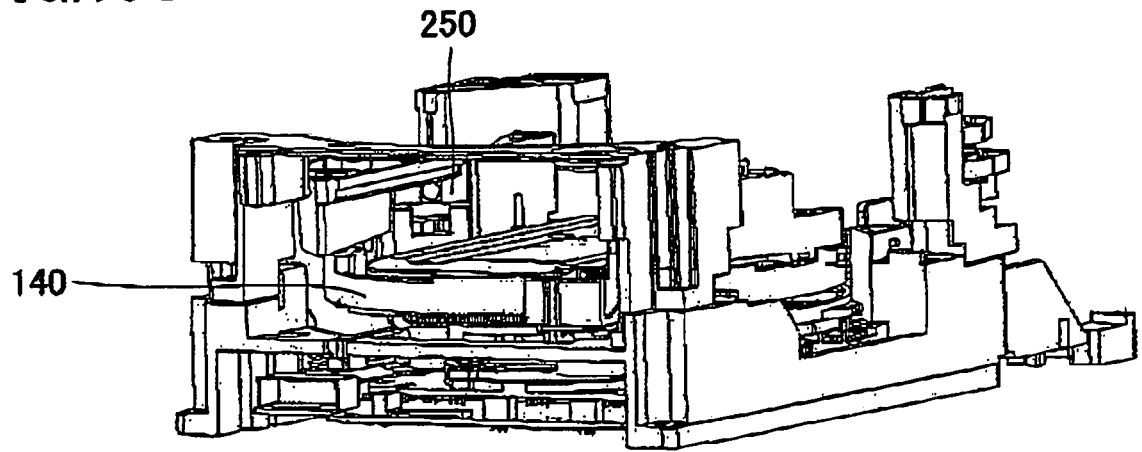

In case of a barcode reading error, according to an instruction of the control circuit 260, the stepping motor 151 is driven accordingly so as to operate the turntable lifting mechanism 150 to raise the turntable 140 a little as shown in FIG. 18A. And then, the barcode 17a is read again by the barcode reader 250. In this case, the beam 251 performs a scan along the line 256H as shown in FIG. 18B. If the barcode reading error occurs again, the stepping motor 151 is, for example, rotated in the reverse direction, so as to operate the turntable lifting mechanism 150 to lower the turntable 140 a little as shown in FIG. 18C. And then, the barcode 17a is read again by the barcode reader 250. In this case, the beam 251 performs a scan along the line 256L as shown in FIG. 18B. These operations can be repeated several times, as necessary.

Accordingly, even if the barcode 17a includes the crack section 18 or the blur section 19, the barcode 17a can be read by changing the scanning position of the beam 251.

Figure 19:
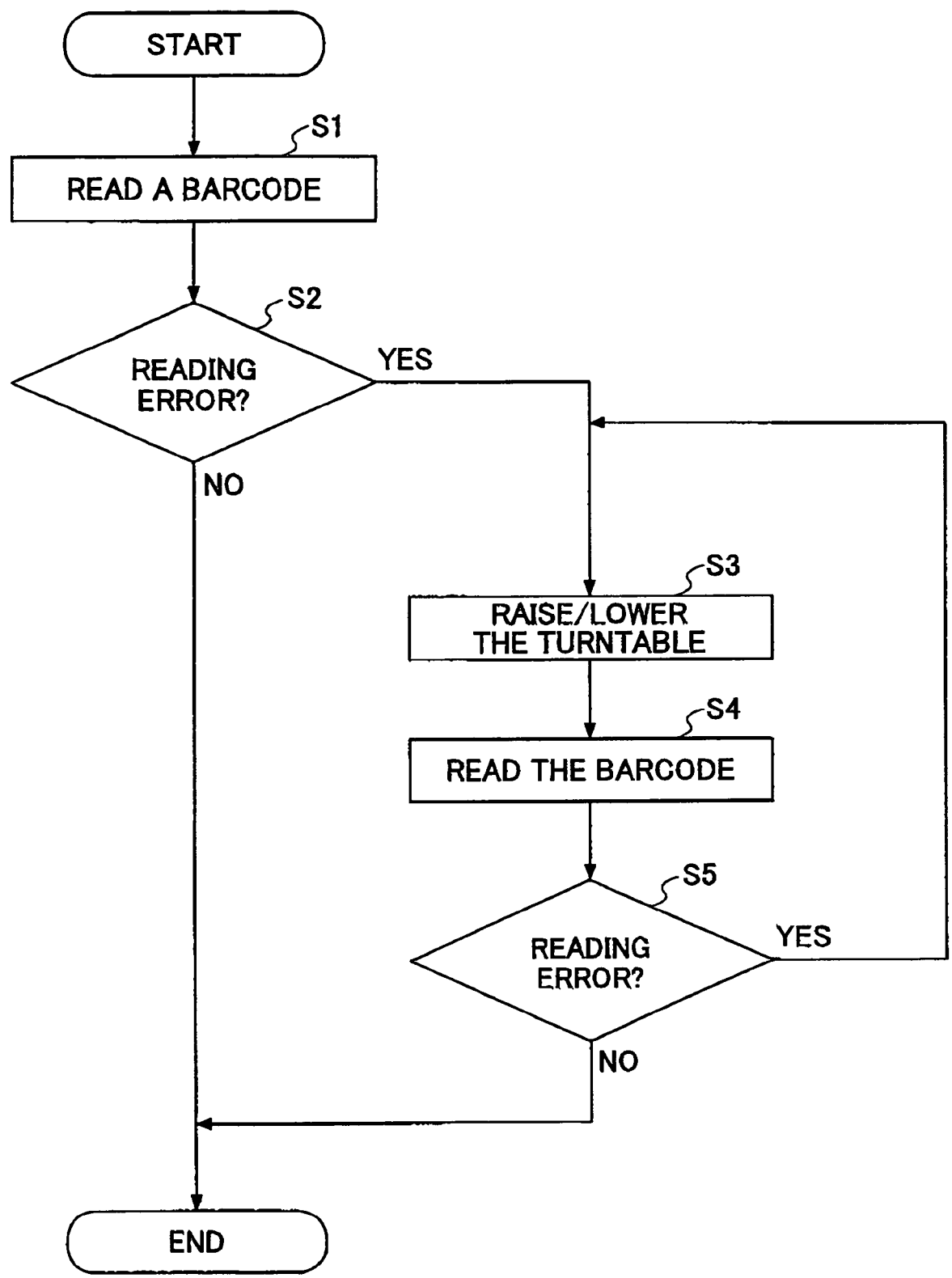
FIG. 19 is a flowchart illustrating the operations of the microcomputer which is a component of the control circuit shown in FIG. 17.

The microcomputer which is a component of the control circuit 260 operates as shown in FIG. 19.

In step S1, a barcode is read. In step S2, it is determined whether an error occurs in reading a barcode. When the error does not occur, the operation is terminated.

If the barcode reading error occurs, the turntable 140 is raised or lowered a little in step S3. Then, the barcode is read again in step S4. It is determined whether the barcode reading error occurs in step S5. If the barcode reading error does not occur, the operation is terminated. If the barcode reading error occurs, the turntable 140 is again raised or lowered a little in step S3, and the barcode is read again in step S4.

Figure 20:
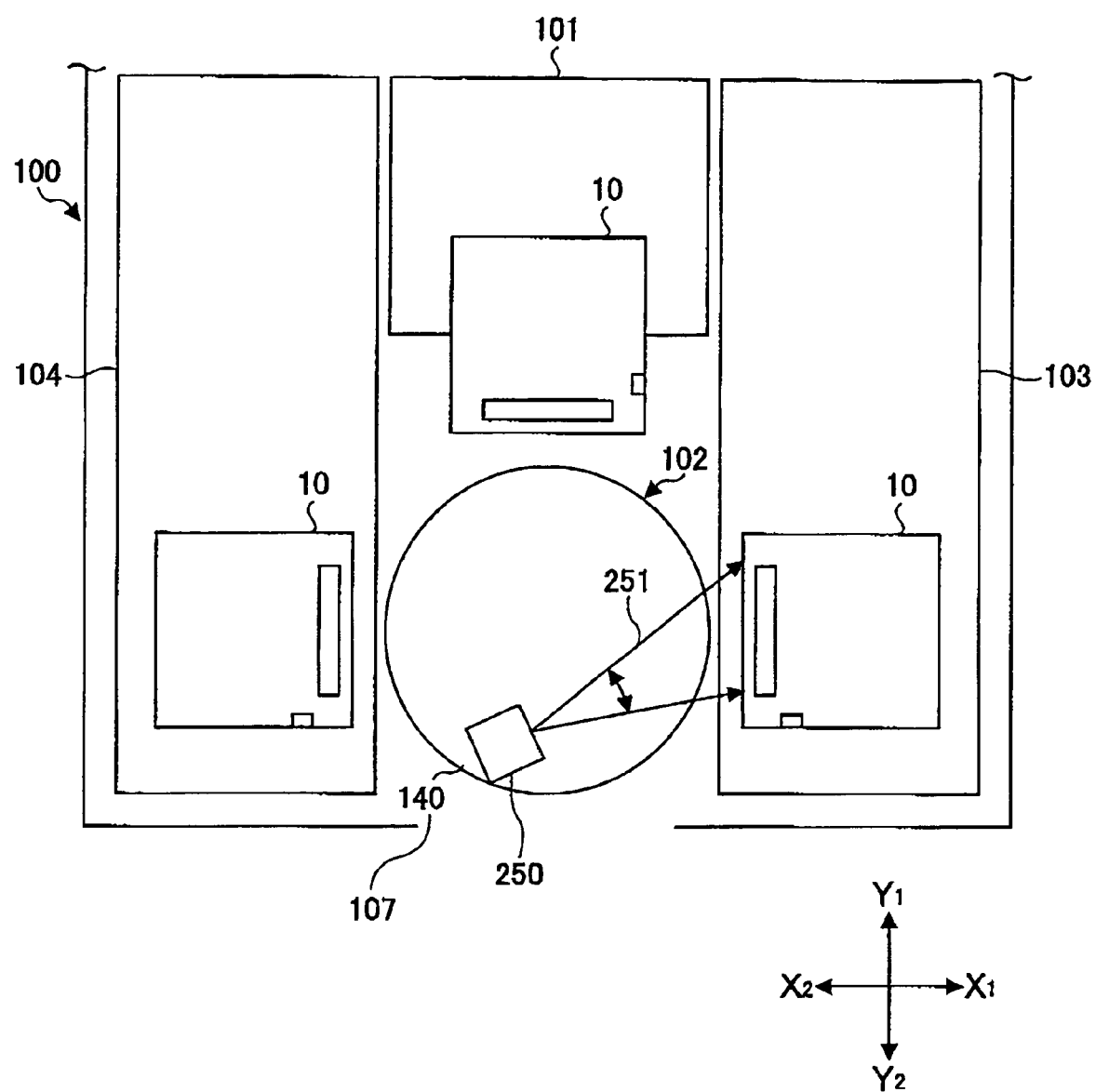
FIG. 20 is a schematic view illustrating the barcode reader reading the barcode of the media cartridge stored in the media cartridge transport magazine on the X2 side.

FIG. 20 shows where the barcode of the tape cartridge 10 in the tape cartridge transport magazine 103 is read. The stepping motor 165 drives the turntable rotating mechanism 160 to locate the turntable 140 at a position where the turntable 140 is rotated at a predetermined rotational increment, such as by approximately 90 degrees, for example, in the clockwise direction from the position shown in FIG. 17. Accordingly, the barcode reader 250 opposes the front side of the tape cartridge 10 in the tape cartridge transport magazine 103.

Figure 21:
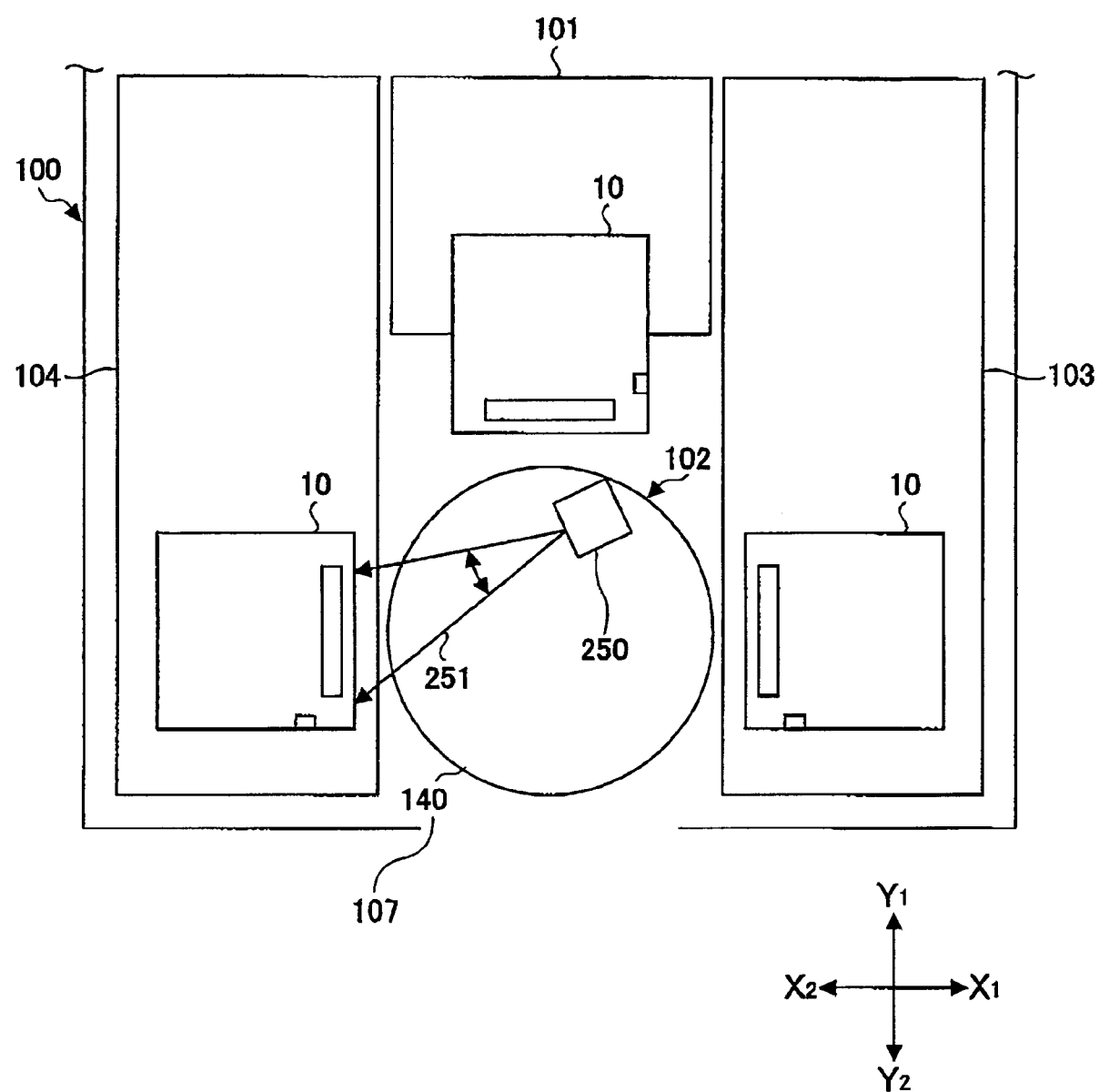
FIG. 21 is a schematic view illustrating the barcode reader reading the barcode of the media cartridge stored in the media cartridge transport mechanism on the X1 side.

FIG. 21 shows where the barcode of the tape cartridge 10 in the tape cartridge transport magazine 104. The stepping motor 165 is driven so as to operate the turntable rotating mechanism 160 to locate the turntable 140 at a position where the turntable 140 is rotated at a predetermined rotational increment, such as by approximately 90 degrees, for example, in the counterclockwise direction from the position shown in FIG. 17. Accordingly, the barcode reader 250 opposes the front side of the tape cartridge 10 in the tape cartridge transport magazine 104.

It should be noted that the angle of mounting the barcode reader 250 can be changed slightly and the original horizontal posture can be changed slightly upward or downward to change the scanning position of the beam 251.

6 [Wiring Path of Flexible Flat Cable 270]

As shown in FIG. 17 schematically, the flexible flat cable 270 extending from the barcode reader 250 to the direction of the center of the turntable 140 reaches the under side of the base 120 via the center of the turntable 140. The flexible flat cable 270 extends along the under side of the base 120 so as to be connected to a connector 261 as shown in FIGS. 13 and 22.

Figure 22:
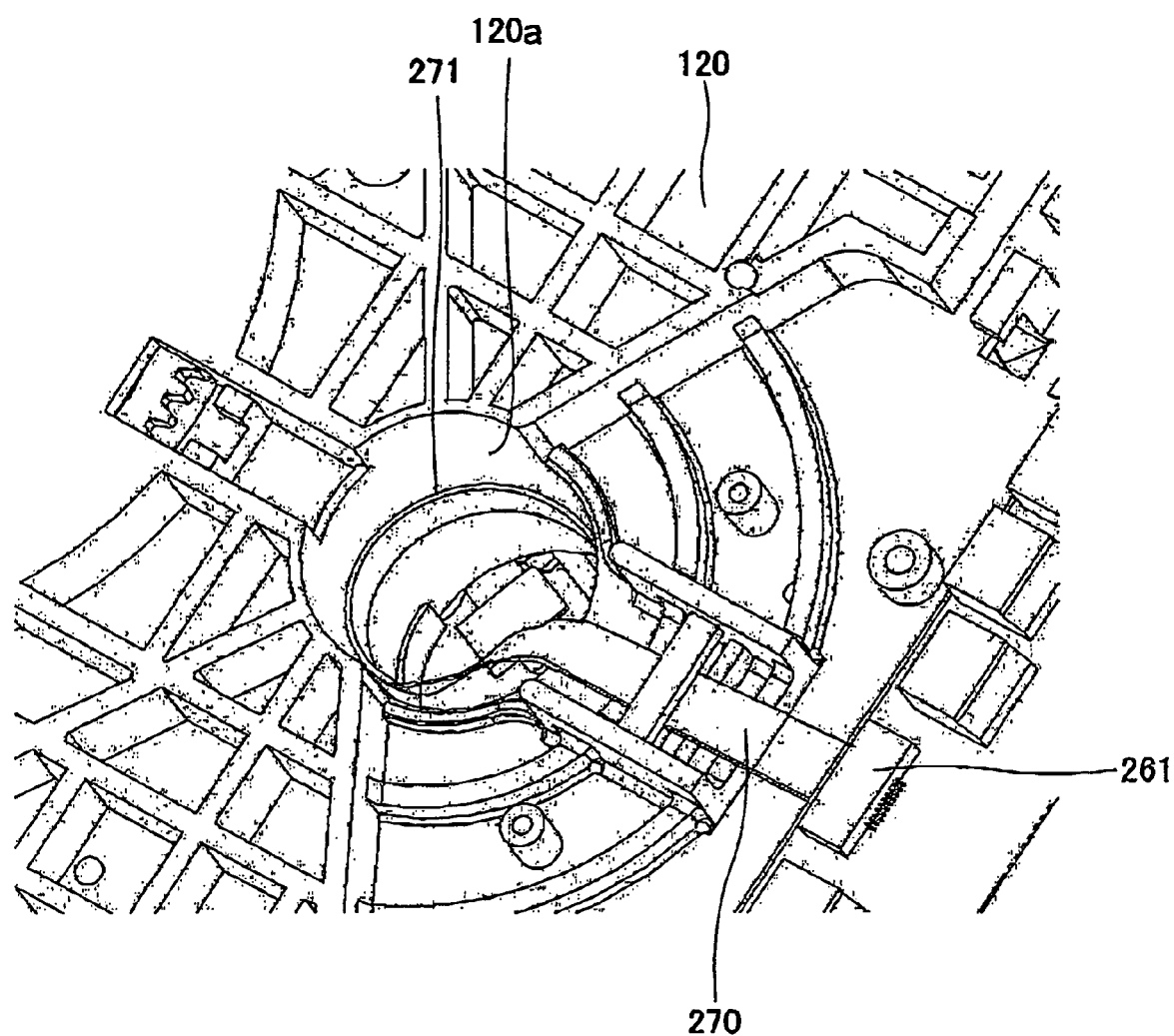
FIG. 22 is a perspective view illustrating the central part of the media cartridge picker viewed from the under side thereof.

In the center part of the turntable 140, the flexible flat cable 270 can be led along the inside edges of the cylindrical section 120a to form a spiral section 271 as shown in FIGS. 13 and 22. In one embodiment, the force of the flexible flat cable 270 pushing against the inside edges of the cylindrical section 120a is obtained from the elastic spring force of the flexible flat cable 270 itself. The spiral section 271 has a clearance between each turn section in the shaft direction of the cylindrical section 120a. Thus, the spiral section 271 sparsely occupies the cylindrical section 120a.

In one embodiment, the turntable 140 rotates in a range of approximately 90 degrees in the clockwise direction and in a range of approximately 90 degrees in the counterclockwise direction each from the position shown in FIG. 17 as a standard. In addition, the turntable 140 is raised and lowered in a range between the height HL and the height HH as shown in FIG. 5.

When the turntable 140 rotates, the entire spiral section 271 is evenly transformed in the closing direction or the expanding direction. When the turntable 140 is raised or lowered, the entire spiral section 271 is transformed by expanding/contracting in the Z1–Z2 direction. Accordingly, the flexible flat cable 270 is durable.

Alternatively, a flexible print cable (FPC) or another type of cable can also be used. In one embodiment, the flexible print cable is led along the inside edges of the cylinder section 120a spirally to form a spiral section in the same way as the flexible flat cable.

The present application is based on Japanese Priority Application No. 2005-269593 filed on Sep. 16, 2005, with the Japanese Patent Office, the entire contents of which are hereby incorporated by reference.

While the particular autoloader 100 as herein shown and disclosed in detail is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A media cartridge autoloader comprising:
   a media cartridge picker including
      a turntable capable of supporting a media cartridge and rotating to change the orientation of the media cartridge supported thereby;
      a turntable rotating mechanism configured to rotate the turntable; and
      a media cartridge transport mechanism provided on the turntable and configured to transport the media cartridge onto and off of the turntable;
   a mail slot through which the media cartridge is inserted or ejected;
   a media drive into which the media cartridge is loaded; and
   a media cartridge storage section configured to store the media cartridge therein;
   wherein the mail slot, the media drive, and the media cartridge storage section are arranged around the media cartridge picker; and
   the media cartridge picker further includes a turntable lifting mechanism that raises and lowers said turntable.

2. The media cartridge autoloader as claimed in claim 1, wherein said media cartridge picker further includes a base having a first cylindrical section;
   said turntable lifting mechanism comprises:
      a second cylindrical section having a boss on a periphery thereof, said second cylindrical section engaging an outer periphery of the first cylindrical section so as to be raised/lowered;
      a rotating ring gear having a slit in a shaft direction wherein the boss fits in the slit, said rotating ring gear engaging the outer periphery of the second cylindrical section;
      a lifting ring gear having a slant groove wherein a tip end of the boss fits in the slant groove, said lifting ring gear rotatably engaging the outer periphery of the rotating ring gear;
      a sub chassis fixed on an upper side of the rotating ring gear; and
      a motor rotating the lifting ring gear, said motor being attached to the sub chassis; and
   said turntable is fixed on an upper side of the second cylindrical section.

3. The media cartridge autoloader as claimed in claim 1, wherein said turntable comprises:
   a barcode reader reading a barcode of the media cartridge which is retained in the media drive; and reading a barcode of another media cartridge stored in the media cartridge storage section; and
   a control device configured such that said media cartridge picker monitors a state where the barcode reader reads the barcode; and when the barcode is not read normally, a position of a beam of the barcode reader scanning the barcode is shifted and the barcode reader reads the barcode again.

4. The media cartridge autoloader as claimed in claim 3, wherein when the barcode is not normally read, said control device is configured to operate the turntable lifting mechanism to raise and lower the turntable.

5. The media cartridge autoloader as claimed in claim 3, wherein said media cartridge picker comprises:
   a base including a first cylindrical section; and
   a second cylindrical section wherein the turntable is fixed on the upper side thereof and rotatably engages an outer periphery of the first cylindrical section; and wherein
   a cable extending from the barcode reader and reaching an under surface of the base of the media cartridge picker via the first cylindrical section is led along inside edges of the first cylindrical section so as to form a spiral section.

6. A media cartridge picker for a media cartridge autoloader, the media cartridge picker moving a media cartridge between the media cartridge picker and one or more of a mail slot through which the media cartridge enters or exits the media cartridge autoloader, a media drive that receives the media cartridge and a media cartridge storage section that stores the media cartridge, the media cartridge picker comprising:
   a turntable having a support surface, the turntable rotatably supporting the media cartridge on the support surface;
   a turntable rotating mechanism that rotates the support surface to change the rotational orientation of the media cartridge;
   a media cartridge transport mechanism that moves the media cartridge relative to the turntable; and
   a turntable lifting mechanism that adjusts a height of the support surface relative to one of the mail slot, the media drive and the media cartridge storage section.

7. The media cartridge picker as claimed in claim 6, further comprising a motor and a base, and wherein the turntable lifting mechanism includes a cylindrical section that supports the turntable, the motor causing an adjustment of the height of the cylindrical section relative to the base to adjust the height of the turntable.

8. The media cartridge picker as claimed in claim 7, wherein the turntable lifting mechanism includes a ring gear having a groove, and wherein cylindrical section includes a boss that engages the groove, wherein the motor rotates the ring gear to cause the boss and the groove to move relative to one another, the groove being configured to guide the boss to adjust the height of the cylindrical section during rotation of the ring gear.

9. The media cartridge picker as claimed in claim 6, wherein the turntable includes a barcode reader that reads a barcode of the media cartridge.

10. The media cartridge picker as claimed in claim 9, wherein the barcode reader reads the barcode of the media cartridge when the media cartridge is at least partially retained in the media drive.

11. The media cartridge picker as claimed in claim 9, wherein the barcode reader reads the barcode of the media cartridge when the media cartridge is at least partially stored in the media cartridge storage section.

12. The media cartridge picker as claimed in claim 9, further comprising a control device that monitors the location that the barcode reader reads the barcode on the media cartridge.

13. The media cartridge picker as claimed in claim 12, wherein the barcode reader directs a beam toward the barcode on the media cartridge during reading of the barcode, the positioning of the beam relative to the media cartridge being adjustable.

14. The media cartridge picker as claimed in claim 13, wherein the control device causes the turntable lifting mechanism to raise or lower the turntable to adjust the positioning of the beam relative to the media cartridge.

15. The media cartridge picker as claimed in claim 9, further comprising a cable extending from the barcode reader, wherein the media cartridge picker includes a base having a first cylindrical section and a second cylindrical section, the turntable being fixed on the second cylindrical section, the turntable rotatably engaging the first cylindrical section; and
   wherein the cable is positioned against an inner edge of the first cylindrical section to position the cable in a substantially spiral configuration.

16. A method for moving a media cartridge within a media cartridge autoloader, the operating a media cartridge autoloader including a media cartridge picker moving a media cartridge between the media cartridge picker and one or more of a mail slot through which the media cartridge enters or exits the media cartridge autoloader, a media drive that receives the media cartridge, a media cartridge storage section that stores the media cartridge and a turntable, said method comprising the steps of:
   rotating a turntable that supports the media cartridge on a support surface to change a rotational orientation of the media cartridge; and
   adjusting a height of the support surface relative to one of (i) a mail slot through which the media cartridge enters an interior of the autoloader, (ii) a media drive that receives the media cartridge to transmit data from the media cartridge and (iii) a media cartridge storage section that stores the media cartridge, with a turntable lifting mechanism.

* * * * *